(12) United States Patent
Zhou et al.

(10) Patent No.: US 11,838,774 B2
(45) Date of Patent: Dec. 5, 2023

(54) TRANSMISSION RECEPTION POINT SPECIFIC BEAM FAILURE RECOVERY PROCESS

(71) Applicant: QUALCOMM Incorporated, San Diego, CA (US)

(72) Inventors: Yan Zhou, San Diego, CA (US); Tianyang Bai, Somerville, NJ (US); Mostafa Khoshnevisan, San Diego, CA (US); Jelena Damnjanovic, Del Mar, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/481,105

(22) Filed: Sep. 21, 2021

(65) Prior Publication Data
US 2022/0104038 A1    Mar. 31, 2022

Related U.S. Application Data
(60) Provisional application No. 63/083,800, filed on Sep. 25, 2020.

(51) Int. Cl.
*H04W 24/04* (2009.01)
*H04W 74/00* (2009.01)
(Continued)

(52) U.S. Cl.
CPC ......... *H04W 24/04* (2013.01); *H04W 72/046* (2013.01); *H04W 74/004* (2013.01); *H04W 74/0833* (2013.01)

(58) Field of Classification Search
CPC . H04B 7/0695; H04B 7/022; H04W 74/0833; H04W 74/004; H04W 72/046; H04W 24/04
See application file for complete search history.

(56) References Cited

U.S. PATENT DOCUMENTS
2019/0379506 A1* 12/2019 Cheng ................... H04L 1/0038
2020/0350972 A1* 11/2020 Yi ............................. H04L 1/12
(Continued)

OTHER PUBLICATIONS
NTT Docomo, Inc'; "Discussion on beam management for MTRP"; 3GPP TSG RAN WG1 #102-e e-Meeting, Aug. 17-Aug. 28, 2020; R1-2006721 (Year: 2020).*

Primary Examiner — Gary Mui
(74) Attorney, Agent, or Firm — Loza & Loza, LLP

(57) ABSTRACT

A plurality of scheduled entities, such as transmission reception points (TRPs), may each transmit at least one TRP-specific beam failure detection reference signal (BFD-RS) having a corresponding TRP identifier (ID) to a scheduled entity. The scheduled entity may be configured with at least one TRP-specific medium access control (MAC) parameter. The scheduled entity may receive the TRP-specific BFD-RSs and respective TRP IDs associated therewith. The scheduled entity may measure each BFD-RSs and count beam failure instances associated with each TRP ID. The scheduled entity may transmit a beam failure recovery request (BFRQ) associated with the respective TRP ID in response to a predetermined quantity of respective TRP-specific BFD-RS measurements of at least one of the respective TRP-specific BFD-RSs being less than a predetermined value. A scheduling entity may receive the BFRQ, where the at least one TRP-specific MAC parameter was used to trigger the BFRQ.

22 Claims, 12 Drawing Sheets

(51) Int. Cl.
    *H04W 74/08*     (2009.01)
    *H04W 72/044*     (2023.01)

(56) References Cited

U.S. PATENT DOCUMENTS

| | | | |
|---|---|---|---|
| 2021/0320764 A1* | 10/2021 | Gao | H04W 72/542 |
| 2021/0351834 A1* | 11/2021 | Yang | H04B 7/0695 |
| 2021/0399784 A1* | 12/2021 | Deghel | H04W 72/02 |
| 2022/0046740 A1* | 2/2022 | Lo | H04W 76/19 |
| 2022/0085862 A1* | 3/2022 | Kung | H04L 1/1819 |
| 2022/0103232 A1* | 3/2022 | Zhou | H04W 76/19 |
| 2022/0103233 A1* | 3/2022 | Zhou | H04B 7/088 |
| 2022/0103234 A1* | 3/2022 | Zhou | H04W 72/21 |
| 2022/0103419 A1* | 3/2022 | Zhou | H04W 72/21 |
| 2022/0104036 A1* | 3/2022 | Zhou | H04W 24/04 |
| 2022/0104037 A1* | 3/2022 | Zhou | H04B 7/022 |
| 2022/0104302 A1* | 3/2022 | Zhou | H04W 74/04 |
| 2022/0200687 A1* | 6/2022 | Guo | H04L 27/2613 |
| 2022/0337363 A1* | 10/2022 | Guo | H04L 5/0048 |
| 2022/0377586 A1* | 11/2022 | Yang | H04B 7/0695 |
| 2023/0006727 A1* | 1/2023 | Jang | H04L 5/0051 |

\* cited by examiner

TRANSMISSION RECEPTION POINT SPECIFIC BEAM FAILURE RECOVERY PROCESS

CLAIM OF PRIORITY UNDER 35 U.S.C. § 119(E)

The present application for patent claims priority to U.S. provisional application No. 63/083,800 titled "TRANSMISSION RECEPTION POINT SPECIFIC BEAM FAILURE RECOVERY TRIGGERING" filed Sep. 25, 2020, and assigned to the assignee hereof and hereby expressly incorporated by reference herein as if fully set forth below and for all applicable purposes.

TECHNICAL FIELD

The technology discussed below relates generally to wireless communication systems, and more particularly, to transmission reception point (TRP)-specific beam failure recovery (BFR) processes.

INTRODUCTION

Wireless communication between devices may be facilitated by various network configurations. In one configuration, a cellular network may enable a user equipment (UE) (e.g., a scheduled entity) in a first cell to communicate with another UE in the first cell or another cell through signaling with a nearby base station (e.g., a scheduling entity, a network access node, a gNB). In some wireless communication systems, a UE and a base station may communicate over a communication link using a directional beam. Changes in the radio environment between the UE and the base station may degrade the quality of the beam used by the UE and the base station, which may result in communication failures between the UE and the base station.

In some wireless communication systems, a UE may communicate with more than one transmission reception point (TRP) (e.g., in a multi-TRP configuration). Each of the more than one TRP may transmit downlink transmissions to the UE according to a beam configuration. The UE may decode the downlink transmissions from each of the more than one TRP according to the beam configurations. The UE may periodically measure certain reference signals transmitted on downlink directional beams from more than one TRP to detect whether a beam failure has occurred. The periodic measurements and processing of measurement results may be referred to as TRP-specific beam failure detection (BFD). The UE may trigger a beam failure recovery (BFR) process to re-establish connection with the TRP when a beam failure is detected.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a scheduled entity in a wireless communication network is disclosed. The scheduled entity includes a wireless transceiver, a memory, and a processor communicatively coupled to the wireless transceiver and the memory. The processor and the memory are configured to: receive a respective transmission reception point (TRP)-specific beam failure detection reference signal (BFD-RS) and a respective TRP identifier (ID) associated with each of a plurality of active beams received by the scheduled entity, and transmit a beam failure recovery request (BFRQ) associated with the respective TRP ID to a scheduling entity in response to a predetermined quantity of respective TRP-specific BFD-RS measurements of at least one of the respective TRP-specific BFD-RS being less than a predetermined value.

In another example, a method of beam failure recovery at a scheduled entity in a wireless communication network is disclosed. The method includes: receiving a respective transmission reception point (TRP)-specific beam failure detection reference signal (BFD-RS) and a respective TRP identifier (ID) associated with each of a plurality of active beams received by the scheduled entity, and transmitting a beam failure recovery request (BFRQ) associated with the respective TRP ID to a scheduled entity in response to a predetermined quantity of respective TRP-specific BFD-RS measurements of at least one of the respective TRP-specific BFD-RS being less than a predetermined value.

In another example, a scheduling entity in a wireless communication network is disclosed. The scheduling entity includes a wireless transceiver, a memory, and a processor communicatively coupled to the wireless transceiver and the memory. The processor and the memory are configured to: transmit at least one beam failure detection reference signal having a corresponding transmission reception point (TRP) identifier (ID) to a scheduled entity, and receive, from the scheduled entity, a beam failure recovery request, where at least one TRP-specific medium access control (MAC) parameter was used to trigger the beam failure recovery request.

In still another example, a method of beam failure recovery at a scheduling entity in a wireless communication network is disclosed. The method includes: transmitting at least one beam failure detection reference signal having a corresponding TRP ID to a scheduled entity, and receive, from the scheduled entity, a beam failure recovery request, where at least one TRP-specific MAC parameter was used to trigger the beam failure recovery request.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
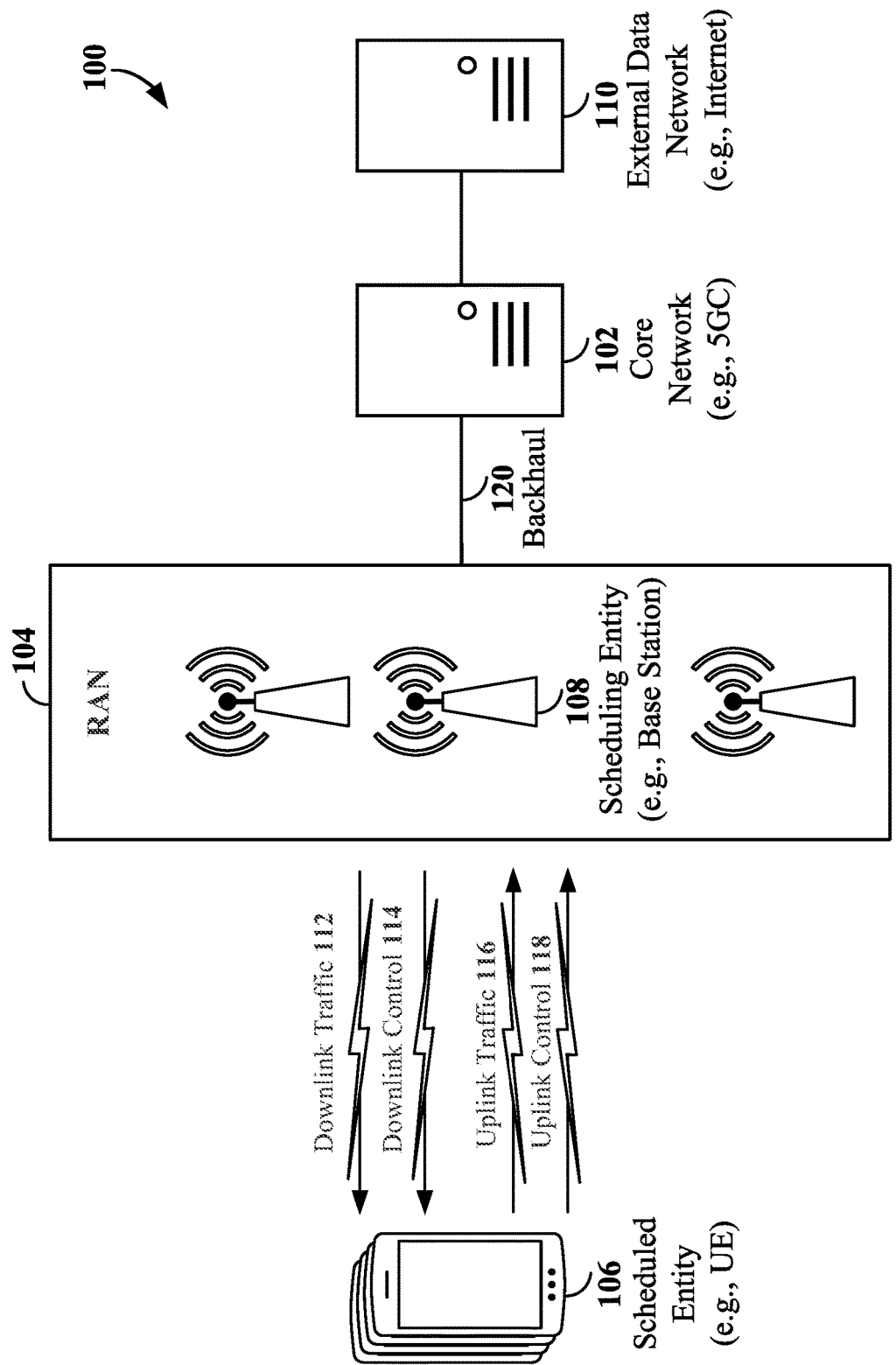
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Improvements in wireless device technology, which allow for ever expanding use of antenna systems that offer spatial diversity, offer ways to optimize network infrastructure and users' interactions with radio access networks. Expanded use of transmission reception points (TRPs) provides opportunities for advancement of technology. A UE having an active set of beams from a plurality of TRPs (e.g., one beam per TRP) may be able to initiate a beam failure recovery process; however, as a part of the beam failure recovery process the UE may undertake to replace the entire active set of beams from the plurality of TRPs even if only one beam from one TRP has failed. By associating a TRP identifier (e.g., a TRP ID) with each TRP, the UE may be able to engage in a beam failure recovery process with one TRP (identified by its own TRP ID) having a failed beam, out of the plurality of TRPs. Described herein are methods and apparatus related to beam failure detection and beam failure recovery on a per TRP basis.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, TX chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, where a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control 114 information, including but not limited to scheduling information (e.g., a grant), synchronization or timing information, or other control information from another entity in the wireless communication network such as the scheduling entity 108. The scheduled entity (e.g., a UE 106) may transmit uplink control 118 information including one or more uplink control channels to the scheduling entity 108. Uplink control 118 information may include a variety of packet types and categories, including pilots, reference signals, and information configured to enable or assist in decoding uplink data transmissions.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
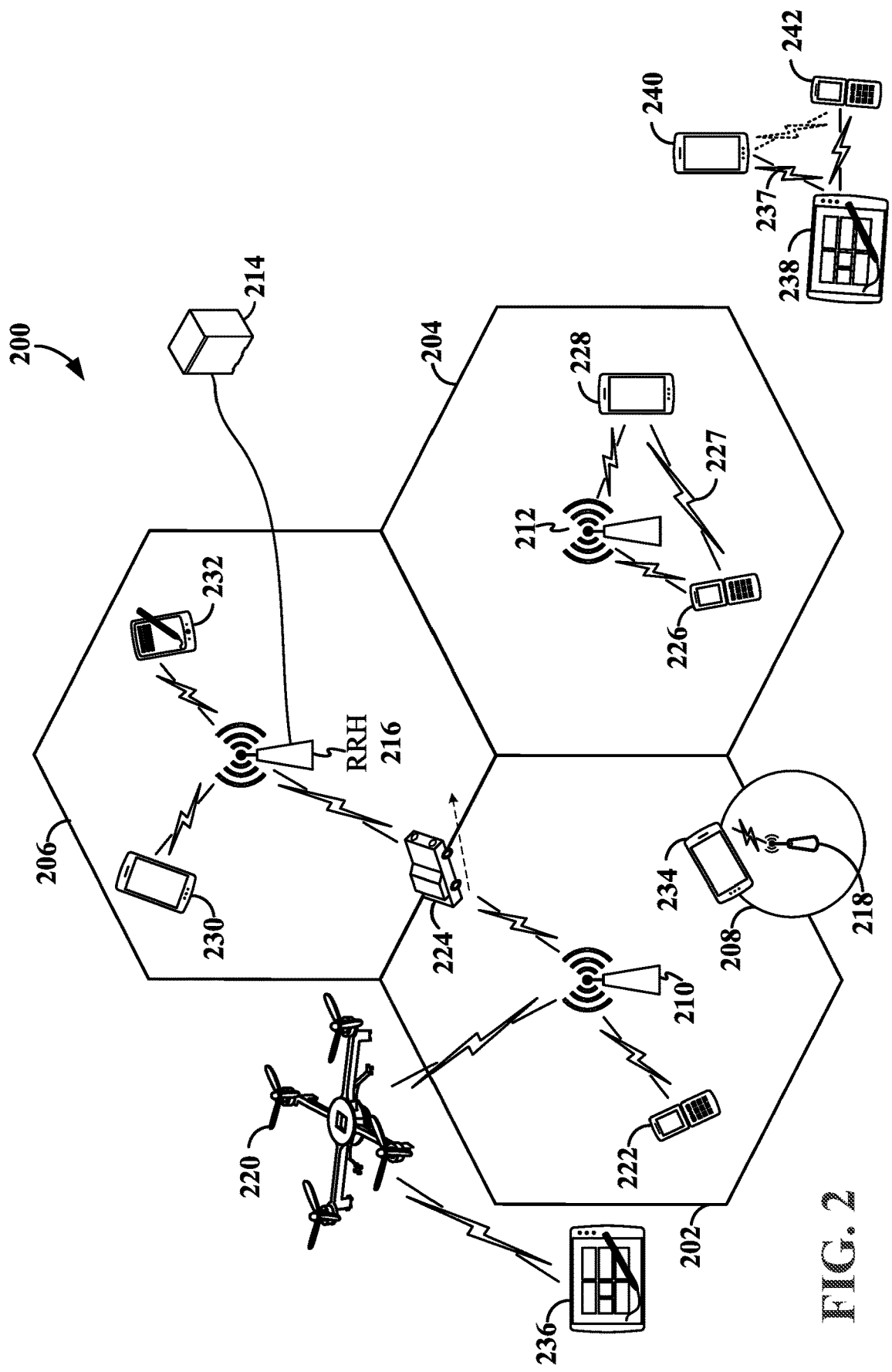
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
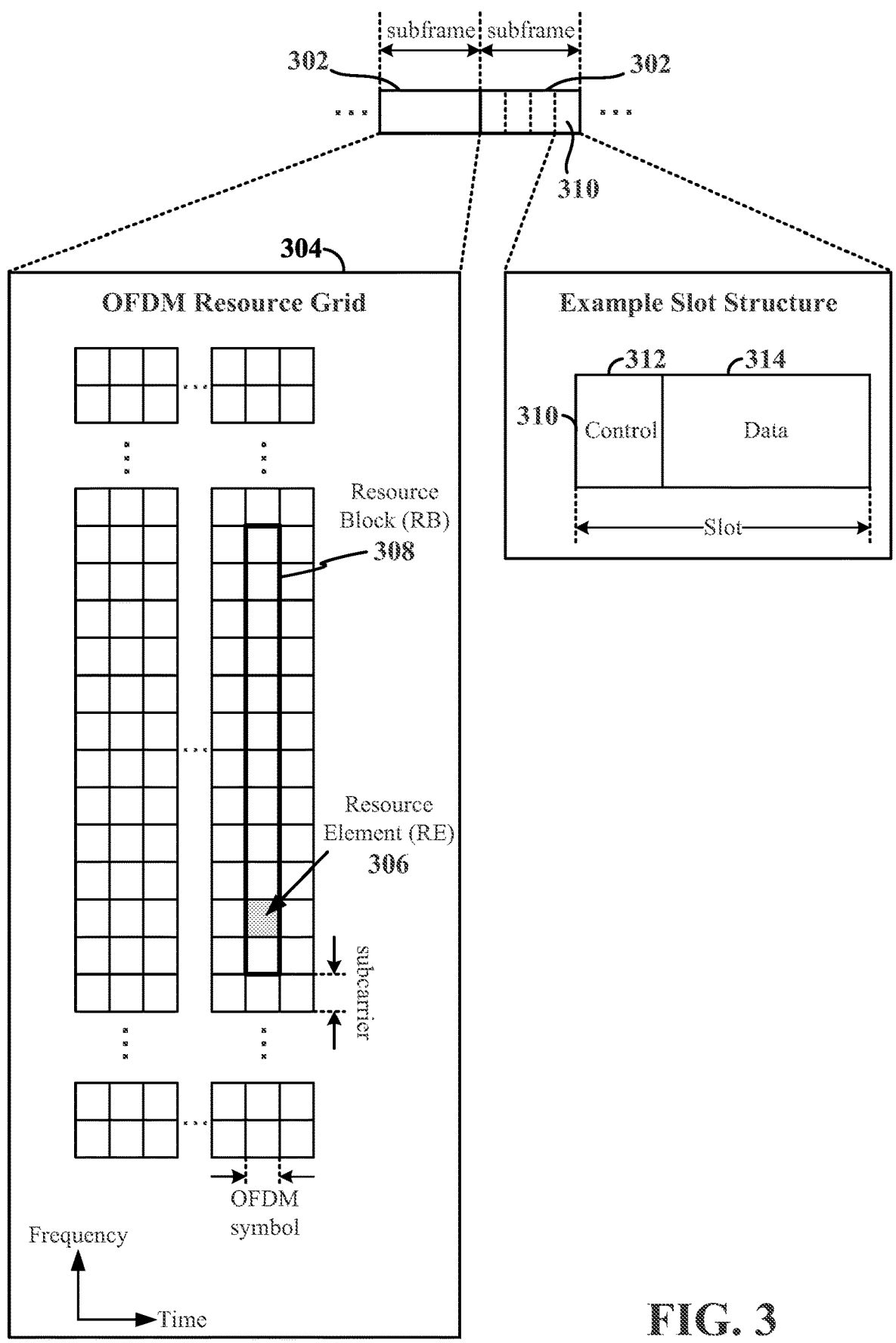
FIG. 3 is a schematic illustration of wireless resources in an air interface utilizing orthogonal frequency divisional multiplexing (OFDM) according to some aspects of the disclosure.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. An additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication.

For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In some aspects of the disclosure, the scheduling entity and/or scheduled entity may be configured for beamforming and/or multiple-input multiple-output (MIMO) technology.

Figure 4:
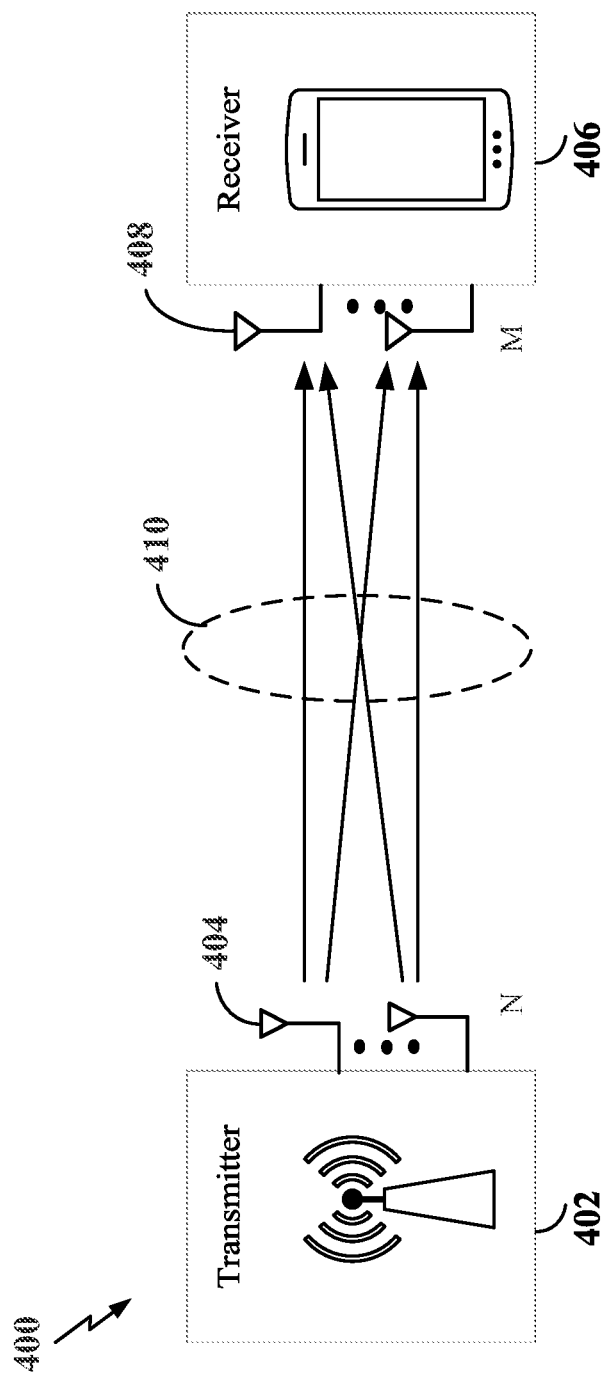
FIG. 4 is a diagram illustrating an example of a wireless communication system supporting beamforming and/or multiple-input multiple-output (MIMO) according to some aspects of the disclosure.

FIG. 4 is a diagram illustrating an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. The multiple transmit antennas 404 and multiple receive antennas 408 may each be configured in a single panel or multi-panel antenna array. Each of the transmitter 402 and the receiver 406 may be implemented, for example, within a scheduling entity (e.g., base station 108), as illustrated in FIGS. 1 and/or 2, a scheduled entity (e.g., UE 106), as illustrated in FIGS. 1 and/or 2, or any other suitable wireless communication device.

The use of such multiple antenna technology enables the wireless communication system 400 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system (e.g., the wireless communication system 400 supporting MIMO) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a sounding reference signal (SRS) transmitted from the UE or other pilot signal). Based on the assigned rank, the base station may then transmit a channel state information-reference signal (CSI-RS) with separate CSI-RS sequences for each layer to provide for multi-layer channel estimation. From the CSI-RS, the UE may measure the channel quality across layers and resource blocks and feed back channel quality indicator (CQI) and rank indicator (RI) values to the base station for use in updating the rank and assigning REs for future downlink transmissions.

In one example, as shown in FIG. 4, a rank-2 spatial multiplexing transmission on a 2×2 MIMO antenna configuration will transmit one data stream from each of the transmit antennas 404. Each data stream reaches each of the receive antennas 408 along a different one of the signal paths 410. The receiver 406 may then reconstruct the data streams using the received signals from each of the receive antennas 408.

Beamforming is a signal processing technique that may be used at the transmitter 402 or receiver 406 to shape or steer an antenna beam (e.g., a transmit/receive beam) along a spatial path between the transmitter 402 and the receiver 406. Beamforming may be achieved by combining the signals communicated via antennas 404 or 408 (e.g., antenna elements of an antenna array) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station.

In some examples, to select one or more serving beams (e.g., one or more downlink transmit beams and one or more downlink receive beams) for communication with a UE, the base station may transmit a reference signal, such as a synchronization signal block (SSB), a tracking reference signal (TRS), or a channel state information reference signal (CSI-RS), on each of a plurality of beams (e.g., on each of a plurality of downlink transmit beams) in a beam-sweeping manner. The UE may measure the reference signal received power (RSRP) on each of the beams (e.g., measure RSRP on each of the plurality of downlink transmit beams) and transmit a beam measurement report to the base station indicating the Layer 1 RSRP (L-1 RSRP) of each of the measured beams. The base station may then select the serving beam(s) for communication with the UE based on the beam measurement report. In other examples, when the channel is reciprocal, the base station may derive the particular beam(s) (e.g., the particular downlink beam(s)) to communicate with the UE based on uplink measurements of one or more uplink reference signals, such as a sounding reference signal (SRS).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

In 5G New Radio (NR) systems, particularly for above 6 GHz or millimeter wave (mmWave) systems, beamformed signals may be utilized for downlink channels, including the physical downlink control channel (PDCCH) and physical downlink shared channel (PDSCH). In addition, for UEs configured with beamforming antenna array modules, beamformed signals may also be utilized for uplink channels, including the physical uplink control channel (PUCCH) and the physical uplink shared channel (PUSCH). However, it should be understood that beamformed signals may also be utilized by, for example, enhanced mobile broadband (eMBB) gNBs for sub 6 GHz systems.

Figure 5:
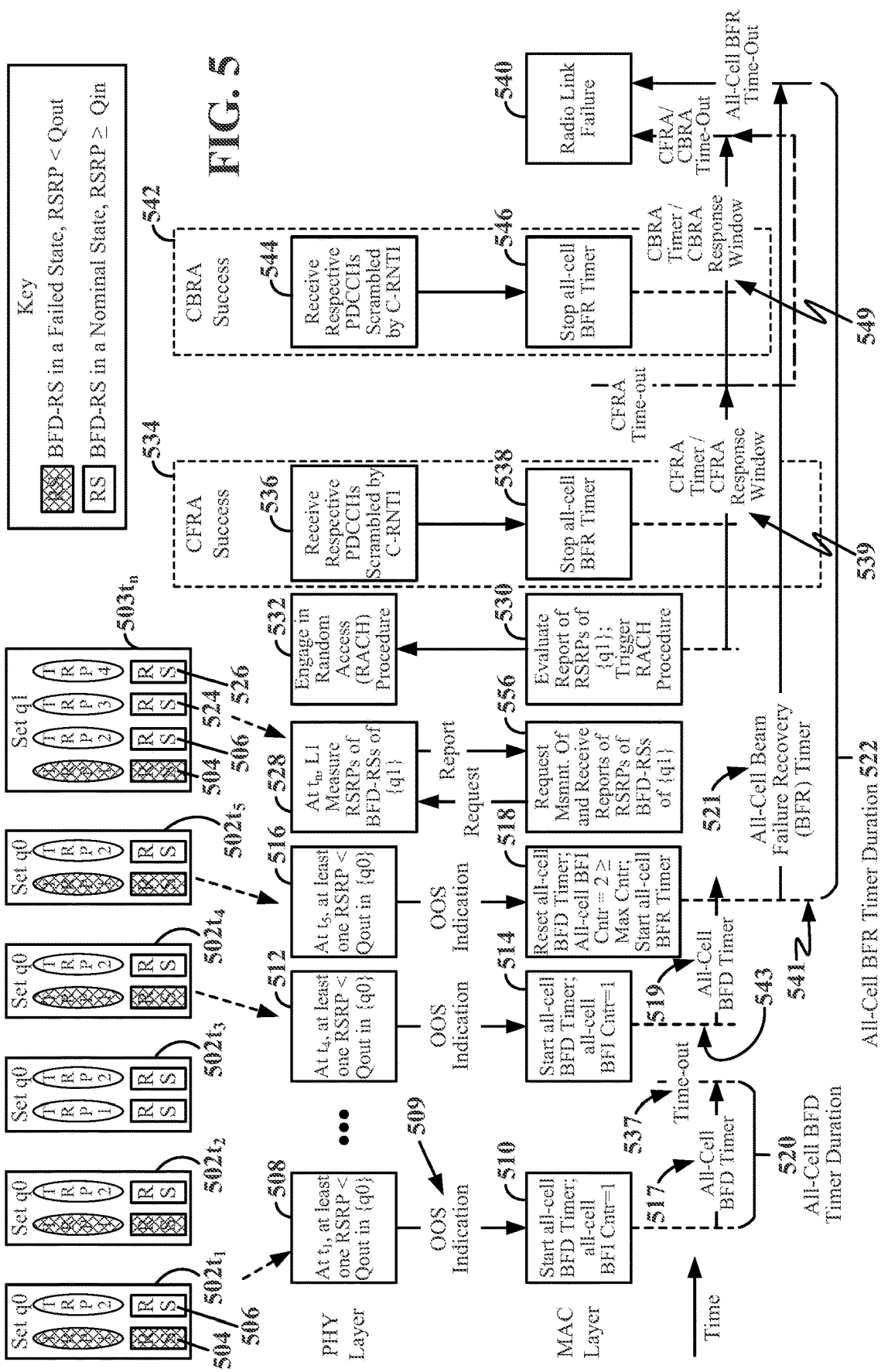
FIG. 5 is a schematic diagram depicting actions and timing considerations that may be taken by a scheduled entity during all-cell beam failure detection and all-cell beam failure recovery processes according to some aspects of the disclosure.

FIG. 5 is a schematic diagram 500 depicting actions and timing considerations that may be taken by a scheduled entity during all-cell beam failure detection (BFD) and all-cell beam failure recovery (BFR) processes according to some aspects of the disclosure. As depicted in FIG. 5, an exemplary first set of candidate beams (on which BFD measurements may be conducted and BFR processes may be performed) is identified as set q0. The set q0 is depicted at five instances in time (e.g., a first instance $502t_1$, a second instance $502t_2$, a third instance $502t_3$, a fourth instance $502t_4$, and a fifth instance $502t_5$). The set q0 depicts two beams; however, any number of beams may be provided in a set of beams. According to some aspects, the processes associated with FIG. 5 may not account for whether one or more beam failures are associated with one or more respective TRPs. Instead, the processes associated with FIG. 5 may relate to cell-wide (or "all-cell") beam failure processes rather than TRP-specific beam failure processes. In an all-cell beam failure process, the failures of beams may be cumulatively counted. Accordingly, in an all-cell beam failure process, a scheduled entity keeps track of a total number of beam failures without regard to the identity/identities of the failed beams.

In FIG. 5, two beams of a set q0 (identified in FIG. 5 using the mathematical notation "{q0}") may represent directional beams from two transmission reception points (TRPs). However, this representation is for ease of explanation only; the two beams of the set q0 may be radiated from one TRP. Furthermore, any set may include one or more beams and may be radiated from one or more TRPs; the use of two TRPs and two respective beams in the set q0 is for ease of illustration and to avoid cluttering the drawing.

TRP1 may periodically transmit a first beam failure detection reference signal (first BFD-RS 504). TRP2 may periodically transmit a second beam failure detection reference signal (second BFD-RS 506). In FIG. 5, the abbreviation "BFD-RS" is further shortened to "RS" to avoid cluttering the drawing. Each BFD-RS may, for example, be a channel state information-reference signal (CSI-RS) or a synchronization signal block (SSB). Other signals may be used as BFD-RSs within the scope of the disclosure. The scheduled entity may know (e.g., have stored in a memory of the scheduled entity) the period of the respective BFD-RSs. It may monitor the beams of a set of candidate beams (e.g., the set q0) for a given BFD-RS according to a known periodicity.

In one aspect, the BFD-RSs may be expressly configured through radio resource control (RRC) signaling or may be obtained from rules applied to scheduled entity operation (e.g., if not expressly configured). For example, if one or more of the BFD-RSs are not configured, the scheduled entity may apply a rule that may cause the scheduled entity to recognize that the non-configured BFD-RS is based on a transmission configuration indicator (TCI) state obtained from a control resource set (CORESET). The CORESET is a set of physical resources within a specific area (e.g., within a specific set of time-frequency resources) in a downlink resource grid (similar to that of FIG. 3) that may be used to carry physical downlink control channel (PDCCH) downlink control information (DCI). For example, the BFD-RS may be mapped to the TCI state, which may be mapped to the CORESET. According to one example, a periodicity of the TCI state may be used to determine which BSR-RS to use.

A first beam transmitted from TRP1 is shown with crosshatching. As shown in the key to FIG. 5, the cross-hatching identifies a BFD-RS in a failed state (e.g., a BFD-RS having a reference signal received power (RSRP) that is less than a first predetermined value). The first predetermined value is identified herein as Qout. The first threshold value, Qout, may be defined as a level at which a downlink radio link cannot be reliably received. A lack of cross-hatching identifies a BFD-RS in a nominal state (e.g., a BFD-RS having an RSRP greater than or equal to a second predetermined value). The second predetermined value is identified herein as Qin. The second predetermined value, Qin, may be defined as a level at which the downlink radio link quality can be more reliably received than at Qout. The measurements of the RSRP may be taken at layer 1 (e.g., L1, the PHY layer) at the scheduled entity.

A beam failure (e.g., RSRP less than Qout) may be caused, for example, by fading, by physical obstruction, by distance, by interference, and/or by atmospheric absorption. The preceding list is exemplary and non-limiting. Other causes of beam failure are within the scope of the disclosure. The first BFD-RS 504 and the second BFD-RS 506 are labeled with reference numbers 504 and 506, respectively, at the first instance $502t_1$ depicted in the upper left area of FIG. 5. Reference numbers 504 and 506 are omitted from the remaining instances (e.g., $502t_2$, $502t_3$, $502t_4$, and $502t_5$) to avoid cluttering the drawing.

In FIG. 5, time is represented along a horizontal axis and increases from left to right. The various spacings between the illustrated first instance $502t_1$ through fifth instance $502t_5$ of the set q0, and between the fifth instance $502t_5$ of the set q0 and a subsequent instance $503t_n$ of a set q1, as well as the various spacings between actions at the PHY and MAC layers depicted in FIG. 5, are not intended to be construed as a depiction of any specific or relative time increment or period; that is, FIG. 5 is not drawn to scale with reference to the time axis.

At block 508, at the first instance $502t_1$, the scheduled entity may make an L1 measurement of the RSRP of the first BFD-RS 504. In the example of FIG. 5, the RSRP of the first BFD-RS 504 at the first instance $502t_1$ is less than the first predetermined value, Qout (i.e., first BFD-RS 504<Qout). Accordingly, at the first instance $502t_1$, the first beam from TRP1 is depicted in a failed state.

Accordingly, the L1 layer may pass an out-of-service (OOS) indication 509 to an upper layer (e.g., the medium access control (MAC) layer, as depicted). In FIG. 5, the first OOS indication 509 is identified with the reference number 509. Further OOS indications are not identified with reference numbers to avoid cluttering the drawing. The OOS indication 509 may also be referred to as a beam failure instance (BFI) indication and/or a physical layer indication. In response to receiving the OOS indication 509, at block 510 the MAC layer may start an all-cell beam failure detection timer (all-cell BFD timer 517) and may increment an all-cell BFI indication counter (all-cell BFI Cntr) by 1 (e.g., from 0) so that the all-cell BFI Cntr=1.

The all-cell BFD timer 517 may be used to avoid unnecessary BFR processes due to momentary fading, for example. According to such an aspect, instead of reacting to each BFI indication, the all-cell BFD timer 517 may allow the scheduled entity to accumulate a count of the number of BFI indications detected for all TRPs in a given cell. The accumulation may continue for a predetermined amount of time, which may be referred to herein as an all-cell BFD timer duration 520. The scheduled entity may trigger an all-cell BFR process if the accumulated number of BFI indications for all TRPs in the given cell is equal to or greater than a predetermined (e.g., preconfigured) maximum count threshold prior to the expiration of the all-cell BFD timer 517 (e.g., at the expiry of the all-cell BFD timer duration 520). Because the BFD-RSs may be transmitted with a known periodicity, the all-cell BFI indication counter (all-cell BFI Cntr) may be incremented according to the same periodicity if, for example, no BFD-RS was detected when a BFD-RS was expected. The all-cell BFD timer duration 520 may be provided by RRC signaling with the parameter beamFailureDetectionTimer, for example. Likewise, the maximum count threshold value for the all-cell BFI Cntr may be provided by RRC signaling with the parameter beamFailureInstanceMaxCount, for example.

If the scheduled entity detects that the BFI indications are greater than or equal to the maximum count threshold prior to a first time-out 537 of the all-cell BFD timer 517, the scheduled entity may begin a beam failure recovery process. In the example of FIG. 5, as described above, the receipt of the OOS indication 509 at the MAC layer may have caused the MAC layer to start the all-cell BFD timer 517 and increment the all-cell BFI indication counter from 0 to 1 (e.g., all-cell BFI Cntr=1). At the second instance $502t_2$, if the failure of the first beam from TRP1 is ongoing (e.g., as depicted by the cross-hatching), the PHY layer may send another OOS indication (not shown) to the MAC layer. At the MAC layer, because the all-cell BFD timer 517 has not reached the first time-out 537, the all-cell BFI indication counter may be incremented from 1 to 2 (e.g., all-cell BFI Cntr=2) (not shown), and the all-cell BFD timer 519 may continue.

Thereafter, in the example of FIG. 5, at the third instance $502t_3$, the failure of the first beam from TRP1 ends (as depicted by the elimination of the cross-hatching). Consequently, at the third instance $502t_3$, the scheduled entity did not detect a beam failure, so the all-cell BFI indication counter in the MAC layer may be left unchanged (e.g., all-cell BFI Cntr=2) (not shown). Meanwhile, as depicted in the example of FIG. 5, the all-cell BFD timer 517, which was still running at the third instance $502t_3$, continues to run until the all-cell BFD timer duration 520 is reached (as shown, prior to the fourth instance $502t_4$) and the all-cell BFD timer 517 reaches the first time-out 537. In this example, and according to some aspects, the all-cell BFD timer 517 and the all-cell BFI indication counter may be reset to zero after reaching the first time-out 537.

However, at the fourth instance $502t_4$, the first beam from TRP1 again fails (e.g., first BFD-RS 504<Qout). At block 512, at the fourth instance $502t_4$, the scheduled entity may make another L1 measurement of the first BFD-RS 504 RSRP. In the example of FIG. 5, the measured RSRP of the first BFD-RS 504 at the fourth instance $502t_4$ is less than the threshold value of Qout (i.e., first BFD-RS 504<Qout). Accordingly, the PHY layer may again send an OOS indication to the MAC layer. At block 514, at the fourth instance $502t_4$, in response to receiving the OOS indication from the PHY layer at block 512, the scheduled entity may again start 543 the all-cell BFD timer 519 (e.g., from zero) and increment the all-cell BFI indication counter from 0 to 1 (e.g., all-cell BFI Cntr=1).

At the fifth instance $502t_5$, the beam failure of the TRP1 beam of the set q0 is ongoing. At block 516, at the fifth instance $502t_5$, the scheduled entity may make another L1 measurement of the first BFD-RS 504 RSRP. In the example of FIG. 5, the L1 measurement of the first BFD-RS 504 RSRP at the fifth instance $502t_5$ remains less than the threshold value of Qout (i.e., first BFD-RS 504<Qout). The measured RSRP at block 516 again reveals an OOS state of the first beam of TRP1, and the PHY layer may again send another OOS indication to the MAC layer. In the example of FIG. 5, the sending of the OOS indication to the MAC layer at the fifth instance $502t_5$ occurs before the expiration of the all-cell BFD timer 519 (e.g., as graphically illustrated by the tip of the arrow representing the all-cell BFD timer 519 appearing to the right of the vertical dashed line denoting the fifth instance $502t_5$). The TRP1 BFD timer is associated with reference number 517 when started at the first instance $502_{t1}$ and reference number 519 when started at the fourth instance $502_{t4}$.

At block 518, in response to receiving the OOS indication, the MAC layer may reset and again start 541 the all-cell BFD timer 517 and increment the all-cell BFI indication counter by 1 (from 1) (e.g., all-cell BFI Cntr=2). In the example of FIG. 5, an RRC configured maximum count (Max Cnt) for the all-cell BFI indication counter was previously set to equal 2 (previous RRC configuration step not shown). Therefore, the maximum count of the all-cell BFI indication counter is reached (BFI Cntr=2≥Max Cntr). Accordingly, at block 518, the MAC layer may start a beam failure recovery process. Accordingly, the MAC layer may start 541 an all-cell BFR timer 521. The all-cell BFR timer duration 522 of the all-cell BFR timer 521 may have been previously configured by RRC signaling (not shown) using the parameter beamFailureRecoveryTimer, for example.

At a subsequent instance $503t_n$, a new set of candidate beams identified as the set q1 may be obtained by the scheduled entity. The set q1 may include the beams of the set q0. The set q1 may also include additional beams not currently used by the scheduled entity (e.g., the additional beams may be known by the scheduled entity but not used by the scheduled entity). Although depicted as being obtained after the fifth instance $502t_5$, the scheduled entity may obtain the set q1 at any time. The additional beams of the set q1 may be used as backup or substitute beams if a beam failure recovery is needed. As illustrated, the set q1 includes one beam from TRP1, TRP2, TRP3, and TRP4. For ease of explanation, TRP1 is associated with the first BFD-RS 504, TRP2 is associated with the second BFD-RS 506, TRP3 is associated with the third BFD-RS 524, and TRP4 is associated with the fourth BFD-RS 526. At the subsequent instance $503t_n$, the first beam associated with the first BFD-RS 504 remains in a beam failure state (e.g., RSRP<Qout).

At block 556, at the subsequent instance 5036 the MAC layer may send a request to the PHY layer to measure the RSRP of the candidate beams in the set q1. At block 528, L1 measurements of the first BFD-RS 504, second BFD-RS 506, third BFD-RS 524, and fourth BFD-RS 526 RSRPs are obtained at the PHY layer and reported to the MAC layer.

At block 530, the MAC layer may evaluate the reported measurements to search for and identify candidate beams in the set q1 with BFD-RS RSRP measurements greater than or equal to the second predetermined value, Qin. For example, the MAC layer may determine that the RSRPs corresponding to the third BFD-RS 524 and the fourth BFD-RS 526 are greater than the second predetermined value, Qin (e.g., third BFD-RS 524>Qin and fourth BFD-RS 526>Qin). In this example, the beams radiating the third BFD-RS 524 of TRP3 and the fourth BFD-RS 526 or TRP4 may be suitable replacements for the beam radiating the first BFD-RS 504 of TRP1. Identifying the suitable replacements may trigger the all-cell BFR processes. Accordingly, at block 530, as a part of the all-cell BFR processes, the MAC layer may trigger (e.g., by signaling the PHY layer) random access procedures with the TRPs associated with the identified new suitable candidate beams (in this example, the suitable candidate beams associated with the third BFD-RS 524 of TRP3 and the fourth BFD-RS 526 of TRP4). In response to the trigger, the PHY layer may be triggered to send beam failure recovery requests (BFRQs) (e.g., RACH requests) to the TRPs associated with the identified new suitable candidate beams. In response to the BFRQs, the TRPs may send BFRQ responses (e.g., RACH responses). The sending of the BFRQs from the scheduled entity and the receiving of BFRQ responses at the scheduled entity are broadly represented by the RACH procedure shown in block 532 of FIG. 5. The random access procedures referred to by block 532 (e.g., triggered RACH procedures) may be contention free random access (CFRA) procedures and/or contention based random access (CBRA) procedures. In accordance with the type of procedure started at block 532, the MAC layer may start a CFRA timer/CFRA response window 539 and/or a CBRA timer/CBRA response window 549.

In a CFRA process, a CFRA preamble may be allocated to a scheduled entity by the TRP. The CFRA preamble may be referred to as a dedicated random access preamble. The dedicated random access preamble may be provided to the scheduled entity via RRC signaling (e.g., specified within an RRC message) or PHY layer signaling (e.g., specified in DCI on the PDCCH). Because a dedicated random access preamble is provided, there is no preamble conflict (i.e., the random access process is "contention free"). CFRA may be known as a three-step RACH procedure. The scheduling entity may assign the dedicated random access preamble to the scheduled entity in the first step. In the second step, the scheduled entity may transmit a random access preamble transmission (e.g., a msg1, also known as a msgA) to the scheduling entity. The msg1 utilizes the dedicated random access preamble. In the third step, the scheduling entity may transmit a random access response (e.g., a msg2, also known as an msgB) to the scheduled entity.

In a CBRA process, the scheduled entity may randomly select a preamble from a pool of preambles shared with other scheduled entities. Random selection from the pool of preambles may result in two scheduled entities selecting the same preamble, in which case a conflict or contention may occur (i.e., the random access process is "contention based"). The scheduling entity may use a contention resolution mechanism to handle CBRA requests. CBRA may be known as a four-step RACH procedure. In the first step, the scheduled entity may transmit the randomly selected random access preamble to the scheduling entity (e.g., a msg1). In the second step, the scheduling entity may send a random access response to the scheduled entity (e.g., a msg2). In the third step, the scheduled entity may transmit an RRC connection request to the scheduling entity (e.g., a msg3). In the fourth step, the scheduling entity may transmit an RRC connection setup to the scheduled entity (e.g., a msg4).

Returning to block 532, the PHY layer may engage in the random access procedures with TRP3 and TRP4. In one example, at block 532, the scheduled entity may engage in CFRA RACH procedures with TRP3 and TRP4. According to the CFRA procedure as described above, for each TRP, the PHY layer transmits a msg1 and either does not receive a response (e.g., does not receive a msg2) in a PDCCH scrambled by the C-RNTI of the scheduled entity within the CFRA response window 539 (as measured by a CFRA timer) or receives the response (e.g., receives the msg2) in the PDCCH scrambled by the C-RNTI of the scheduled entity within the CFRA response window 539. If the msg2 is received within the CFRA response window 539 (e.g., corresponding to a CFRA success 534), then at block 536, the scheduled entity receives and decodes the respective PDCCH scrambled by the C-RNTI of the scheduled entity. The PHY layer may inform the MAC layer of the CFRA success 534, and at block 538 the MAC layer may stop the all-cell BFR timer 521 and consider the beam failure recovery process a success. However, if the scheduled entity does not receive one or both random access responses (e.g., msg2s) in respective PDCCHs scrambled by the C-RNTI of the scheduled entity within the CFRA response window 539, then the CFRA response window 539 times out and, at block 540, the MAC layer may declare a higher layer failure, referred to as a radio link failure (RLF).

In another example, returning to block 532, the scheduled entity may send RACH requests according to contention based random access (CBRA) procedures. According to some aspects, the CBRA procedures may be employed (e.g., prior to declaring the higher layer failure at block 540) if the CFRA procedures are not successful. Under the CBRA procedures, the PHY layer sends respective msg1s (e.g., CBRA msg1s) and either does not receive respective random access responses (e.g., does not receive one or more msg2s) in respective PDCCHs scrambled by the C-RNTI of the scheduled entity within the CBRA response window 549 or receives the respective random access responses (e.g., the msg2s) in the PDCCH scrambled by the C-RNTI of the scheduled entity within the CBRA response window 549.

As explained above, according to the CBRA procedure, there are four messages exchanged (msg1, msg2, msg3, and msg4). For the CBRA procedure to ultimately be successful (e.g., CBRA success 542), the scheduled entity, at block 544, may receive and decode the respective msg4s in the respective PDCCHs scrambled by the C-RNTI of the scheduled entity within the CBRA response window 549. The PHY layer may inform the MAC layer of the CBRA success 542, and at block 546 the MAC layer may stop the all-cell BFR timer 521 and consider the beam failure recovery process a success. However, if the scheduled entity does not receive the respective responses (e.g., does not receive the respective msg2s or receives the respective msg2s but does not receive respective msg4s) in the respective PDCCHs scrambled by the C-RNTI of the scheduled entity within the CBRA response window 549, then the CBRA response window 549 times out and, at block 540, the MAC layer may declare the higher layer failure, known as the radio link failure (RLF). Beam failure recovery may be considered concluded upon CFRA procedure success at block 534, CBRA success at block 542, or upon declaring the radio link failure 540.

Use of the all-cell beam failure detection/beam failure recovery processes, such as those generally described above in connection with FIG. 5, may be undertaken in terms of beam failures of one or more TRPs within an entire cell (e.g., an entire primary cell (PCell), special cell (SPCell), or secondary cell (SCell)). A cell may have many TRPs, yet the processes of FIG. 5 may be TRP agnostic (e.g., where TRP identities are not considered or may be transparent with respect to the processes). The TRP agnostic processes of FIG. 5 may be referred to as all-cell BFD/all-cell BFR processes. The TRP agnostic all-cell BFD/all-cell BFR processes may cause the scheduled entity to select an entirely new set of candidate beams, replacing the entire set of active beams currently used by the scheduled entity. This may waste valuable processing time and may waste or tie up valuable resources.

According to some aspects of the disclosure however, one or more beam BFI indications may be counted on a per TRP basis (also referred to as a TRP-specific basis). TRP identifiers (e.g., TRP IDs) may be utilized, for example, to differentiate a first number of BFI indications associated with a first TRP having a first TRP ID from a second number of BFI indications associated with a second TRP having a second TRP ID. The first TRP and the second TRP may form a set of TRPs associated with respective active beams utilized by a scheduled entity. The first TRP and the second TRP may be two of two or more TRPs having respective active beams associated with the scheduled entity. While two TRPs having respective active beams are described for convenience, one TRP having two or more active beams may also fall within the scope of the disclosure.

According to some aspects, the MAC layer, for example, may utilize counters to record the number of BFI indications on a TRP-specific basis. The MAC layer may determine that the number of BFI indications stored, for example, in association with a first counter corresponding to the first TRP ID, has a quantity of BFI indications that is equal to or greater than a maximum configured number of BFI indications (e.g., an RRC configured maximum that may be set by a parameter such as beamFailureInstanceMaxCount or beamFailureInstanceMaxCount_TRP-Specific). Upon the first counter reaching the maximum configured number of BFI indications, the scheduled entity may trigger a beam failure recovery request (BFRQ) for only the first TRP having the first TRP ID. According to such aspects, the scheduled entity may avoid wasted effort and time associated with replacing an entire active set of beams with a new set of candidate beams when only one of the active set of beams had failed. According to such aspects, in a TRP-specific BFD/BFR process, the scheduled entity may trigger a RACH procedure (such as those triggered at block 530 of FIG. 5) on a TRP-specific basis rather than on a multi-TRP/all-cell basis. According to such aspects, instead of utilizing an all-cell BFD timer 517, an all-cell BFR timer 521, and an all-cell BFI indication counter (e.g., all-cell BFI Cntr of FIG. 5), a scheduled entity may utilize a TRP-specific BFD timer, a TRP-specific BFR timer, and a TRP-specific BFI indication counter for each TRP having a given respective TRP ID.

Figure 6:
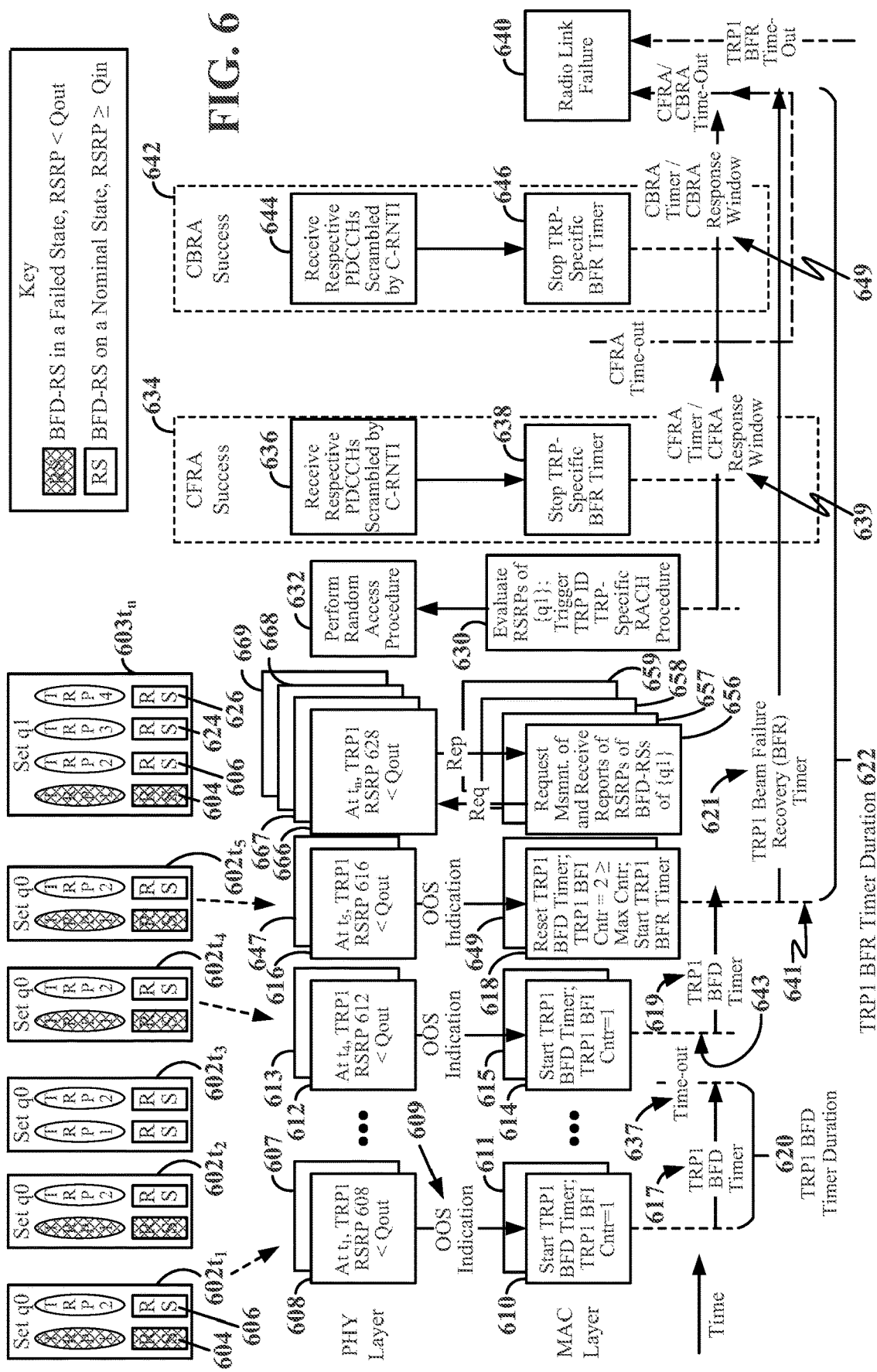
FIG. 6 is a schematic diagram depicting actions and timing considerations that may be taken by a scheduled entity during TRP-specific beam failure detection and TRP-specific beam failure recovery processes according to some aspects of the disclosure.

FIG. 6 is a schematic diagram 600 depicting actions and timing considerations that may be taken by a scheduled entity during TRP-specific beam failure detection (BFD) and TRP-specific beam failure recovery (BFR) processes according to some aspects of the disclosure. A general summary of the TRP-specific BFD and TRP-specific BFR processes is provided as a non-limiting introduction to the subject matter of FIG. 6.

In some examples, according to some aspects of the TRP-specific BFD and TRP-specific BFR processes described herein, a scheduled entity may detect a beam failure of a first TRP of a set of one or more TRPs. A beam failure may be detected, for example, when a Layer 1 measured RSRP of a TRP-specific BFD-RS (referred to herein as a TRP-specific BFD-RS to indicate the use of the BFD-RS with a beam failure recovery process) for the first TRP (e.g., a connected/active beam) falls below the first predetermined value, Qout or QoutLR (where "LR" stands for "link recovery"). According to some aspects, the parameter Qout may be used in connection with all-cell BFD/BFR processes, and the parameter QoutLR may be used in connection with TRP-specific BFD/BFR processes. The QoutLR parameter value may be similar to the Qout parameter described above. The QoutLR parameter may be defined as a level at which a downlink radio level link of a given resource configuration on a set, q0, of beam candidates cannot be reliably received. The QoutLR parameter value may be compared to the RSRP of the TRP-specific BFD-RS to determine if the RSRP of the TRP-specific BFD-RS is less than the QoutLR parameter value; if less, then a value of a BFI indication counter may be incremented, for example. The parameters Qout and QoutLR may be used interchangeably herein.

In some examples, the scheduled entity may search among candidate beams to identify a candidate beam to replace the first TRP. An acceptable candidate beam may be identified when a Layer 1 measured RSRP of the TRP-specific BFD-RS of the acceptable candidate beam is equal to or above the second predetermined value, Qin. The acceptable candidate beam may be associated with an acceptable TRP, which is different from the first TRP.

In some examples, if a predetermined number of beam failure incidences (BFIs) of the first TRP are detected (e.g., a maximum value that may be RRC configured using the parameter beamFailureInstanceMaxCount), the scheduled entity may trigger a beam failure recovery process by sending a beam failure recovery request (BFRQ) to the acceptable candidate TRP. The BFR process may be a random access procedure. Accordingly, the scheduled entity may engage in a random access procedure with the TRP associated with the acceptable TRP-specific BFD-RS. The random access procedure may have an ID specified in an RRC configured parameter referred to as BFR-SSB-Resource.ra-PreambleIndex. A synchronization signal block (SSB) may be identified by the RRC configured parameter SSB, which provides an SSB-Index value.

In some examples, the TRP associated with the acceptable TRP-specific BFD-RS may reply to the BFRQ (e.g., by sending a physical random access channel (PRACH) response). For example, the TRP associated with the acceptable TRP-specific BFD-RS may send a DCI for msg2 via the search space specified by the RRC configured recoverySearchSpaceId parameter.

Parameters related to TRP-specific BFD processes and TRP-specific BFR processes may be RRC configured. For example, a TRP-specific BFD timer 617 may be RRC configured using, for example, a parameter such as a beamFailureDetectionTimer_TRP-Specific, a TRP-specific BFR timer (e.g., the TRP1 BFR timer 621) may be RRC configured using, for example, the parameter beamFailureRecoveryTimer_TRP-Specific, and/or a maximum number of BFIs may be RRC configured using, for example, the parameter beamFailureInstanceMaxCount (as used in the all-cell BFD/BFR processes). The predetermined duration, until a time-out condition is reached on the TRP-specific BFD timer 617, may be RRC configured using, for example, the parameter beamFailureDetectionTimer_TRP-Specific. The predetermined duration, until a time-out condition is reached on the TRP-specific BFR timer (e.g., TRP1 BFR timer 621), may be RRC configured using, for example, the parameter beamFailureRecoveryTimer_TRP-Specific. The RACH configuration may be RRC configured using, for example, the parameter rach-ConfigBFR, which may provide certain parameters to the scheduled entity. The certain parameters may include, for example, a PRACH configuration index value, a msg1 start frequency, and a random access response window, to name a few. Other parameters used for BFR may also be RRC configured. The preceding parameters are provided for exemplary and non-limiting purposes.

In FIG. 6, an exemplary first set of active beams, q0, is depicted at five instances in time (e.g., a first instance $602t_1$, a second instance $602t_2$, a third instance $602t_3$, a fourth instance $602t_4$, and a fifth instance $602t_5$). Like FIG. 5, time represented along a horizontal axis increases from left to right, but is not drawn to scale with reference to the time axis. A first beam transmitted from TRP1 is shown with cross-hatching. As shown in the key to FIG. 6, the cross-hatching identifies a TRP-specific BFD-RS in a failed state (e.g., RSRP of the TRP-specific BFD-RS<QoutLR). A second beam transmitted from TRP2 is shown without cross-hatching. As shown in the key to FIG. 6, an absence of cross-hatching identifies a TRP-specific BFD-RS in a nominal state (e.g., RSRP of the TRP-specific BFD-RS≥Qin).

At block 608, at the first instance $602t_1$, the scheduled entity may make an L1 measurement of the RSRP of the first TRP-specific BFD-RS 604 of TRP1. In the example of FIG. 6, the RSRP of the first TRP-specific BFD-RS 604 of TRP1 at the first instance $602t_1$ is less than the first predetermined value, QoutLR (i.e., RSRP of the first TRP-specific BFD-RS 604<QoutLR). At block 607, at the first instance $602t_1$, the scheduled entity may make an L1 measurement of the RSRP of the second TRP-specific BFD-RS 606 of TRP2. In the example of FIG. 6, the RSRP of the second TRP-specific BFD-RS 606 of TRP2 at the first instance $602t_1$ is greater than or equal to the second predetermined value, Qin (i.e., RSRP of the second TRP-specific BFD-RS 606≥Qin).

Accordingly, the L1 layer may send an OOS indication 609 to an upper layer (e.g., the medium access control (MAC) layer, as depicted). In FIG. 6, the first OOS indication 609 is identified with the reference number 609. Further OOS indications are not identified with reference numbers to avoid cluttering the drawing. The OOS indication 609 may also be referred to as a beam failure instance (BFI) indication and/or a physical layer indication. In response to receiving the OOS indication 609, at block 610, the MAC layer may start a TRP-specific beam failure detection timer (e.g., TRP1 BFD timer 617). The MAC layer may increment a TRP-specific BFI indication counter (e.g., TRP1 BFI Cntr) by 1 (e.g., from 0) so that the TRP-specific BFI indication counter is equal to 1. In the example, the TRP-specific BFD timer is identified as the TRP1 BFD timer 617, the TRP-specific BFI indication counter is identified as the TRP1 BFI Cntr. At least because the TRP2 RSRP of the TRP2 BFD-RS is greater than or equal to Qin at block 607, the MAC layer, at block 611, need not set a TRP2 BFD timer or increment a TRP2 BFI counter.

Similar to the all-cell BFD timer 517 of FIG. 5, the TRP-specific BFD timer of FIG. 6 (e.g., the TRP1 BFD timer 617) may be used to avoid unnecessary BFR processes due to momentary fading, for example. According to such an aspect, instead of reacting to each BFI indication associated with TRP1, the TRP1 BFD timer 617 may allow the scheduled entity to accumulate a count of the number of BFI indications detected in connection with TRP1 in a given cell. The accumulation may continue for a predetermined amount of time, which may be referred to herein as a TRP-specific BFD timer duration (hereinafter referred to as TRP1 BFD timer duration 620). The scheduled entity may trigger a TRP-specific BFR process if the accumulated number of BFI indications associated with TRP1 in the given cell is equal to or greater than a predetermined maximum count prior to the expiration of the TRP1 BFD timer 617 (e.g., at the expiry of the TRP1 BFD timer duration 620).

As in FIG. 5, TRP-specific BFD-RSs may be transmitted with a known periodicity; therefore, the TRP-specific BFI indication counter (e.g., TRP1 BFI Cntr) may be incremented according to the same periodicity if, for example, no TRP-specific BFD-RS was detected when a TRP-specific BFD-RS was expected in connection with TRP1. For example, the TRP1 BFD timer duration 620 may be provided by RRC signaling with the parameter beamFailureDetectionTimer_TRP-Specific. Likewise, the maximum count value for the TRP-specific BFI Cntr may be provided by RRC signaling with the parameter beamFailureInstanceMaxCount, for example. The maximum count may be given on a TRP-specific basis or an all-cell basis.

If the scheduled entity detects that the BFI indications associated with TRP1 are greater than or equal to the maximum count prior to a first time-out 637 of the TRP1 BFD timer 617, the scheduled entity may begin a beam failure recovery process. In the example of FIG. 6, as described above, the receipt of the OOS indication 609 at the MAC layer may have caused the MAC layer to start the TRP1 BFD timer 617 and increment the TRP1 BFI indication counter from 0 to 1 (e.g., TRP1 BFI Cntr=1). At the second instance $602t_2$, if the failure of the first beam from TRP1 is ongoing (e.g., as depicted by the cross-hatching), the PHY layer may send another OOS indication (not shown) to the MAC layer. At the MAC layer, because the TRP1 BFD timer 617 has not reached the first time-out 637, the TRP1 BFI indication counter may be incremented from 1 to 2 (e.g., TRP1 BFI Cntr=2) (not shown), and the TRP1 BFD timer 617 may continue. Because there are no beam failures associated with TRP2, there is no need to start, at block 611, a TRP2 BFD timer.

Thereafter, in the example of FIG. 6, at the third instance $602t_3$, the failure of the first beam from TRP1 ends (as depicted by the elimination of the cross-hatching). As a consequence, at the third instance $602t_3$, the scheduled entity detected a nominal RSRP (e.g., RSRP of TRP-specific BFD-RS associated with TRP2≥Qin), so the TRP1 BFI indication counter 620 in the MAC layer may be left unchanged (e.g., TRP1 BFI Cntr=2) (not shown). Meanwhile, as depicted in the example of FIG. 6, the TRP1 BFD timer 617, which was still running at the third instance $602t_3$, continues to run until the TRP1 BFD timer duration 620 is reached (as shown, prior to the fourth instance $602t_4$) and the TRP1 BFD timer 617 reaches the first time-out 637. In this example, and according to some aspects, the TRP1 BFD timer 617 and the TRP1 BFI indication counter 620 may be reset to zero after reaching the first time-out 637.

At block 612, at the fourth instance $602t_4$, the scheduled entity may make another L1 measurement of the RSRP of the first TRP-specific BFD-RS 604. In the example of FIG. 6, the measured RSRP of the first TRP-specific BFD-RS 604 at the fourth instance $602t_4$ is less than the value of QoutLR (i.e., RSRP of the first TRP-specific BFD-RS 604<QoutLR). Accordingly, the PHY layer may again send an OOS indication to the MAC layer. At block 613, at the fourth instance 602$t_4$, the scheduled entity may make another L1 measurement of the RSRP of the second TRP-specific BFD-RS 606. In the example of FIG. 6, the measured RSRP of the second TRP-specific BFD-RS 606 at the fourth instance 602$t_4$ is greater than or equal to Qin. Accordingly, the PHY layer need not send an OOS indication to the MAC layer.

At block 614, at the fourth instance 602$t_4$, in response to receiving the OOS indication sent from the PHY layer in connection with a first TRP ID (e.g., TRP1) at block 612, the scheduled entity may start the TRP1 BFD timer 619 (e.g., from zero) and increment the TRP1 BFI indication counter from 0 to 1 (e.g., TRP-specific BFI Cntr=1). The start of the TRP BFD timer 619 is graphically represented by the first dashed vertical line 643 of FIG. 6. Because there are no beam failures associated with TRP2, there is no need to start, at block 615, a TRP2 BFD timer.

At the fifth instance 602$t_5$, the beam failure of the TRP1 beam of the set q0 is ongoing. At block 616, at the fifth instance 602$t_5$, the scheduled entity may make another L1 measurement of the first TRP-specific BFD-RS 604 RSRP. In the example of FIG. 6, the L1 measured first TRP-specific BFD-RS 604 RSRP at the fifth instance 602$t_5$ remains less than the threshold value of QoutLR. The measured RSRP at block 616 again reveals an OOS state of the first beam of TRP1, and the PHY layer may again send another OOS indication to the MAC layer. In the example of FIG. 6, the sending of the OOS indication to the MAC layer at the fifth instance 602$t_5$ occurs before the expiration of the TRP1 BFD timer 619 (e.g., as graphically illustrated by the tip of the arrow representing the TRP1 BFD timer 619 appearing to the right of the vertical dashed line denoting the fifth instance 602$t_5$). The TRP1 BFD timer is associated with reference number 617 when started at the first instance 602$t_1$ and reference number 619 when started at the fourth instance 602$t4$. At block 647, at the fifth instance 602$t_5$, the scheduled entity may make another L1 measurement of the second TRP-specific BFD-RS 606 RSRP. In the example of FIG. 6, the L1 measured second TRP-specific BFD-RS 606 RSRP at the fifth instance 602$t_5$ is greater than or equal to Qin. Accordingly, the PHY layer may not need to send an OOS indication (associated with the second TRP-specific BFD-RS 606) to the MAC layer.

At block 618, in response to receiving the OOS indication, the MAC layer may reset and again start (not shown) the TRP1 BFD timer 617, 619 and increment the TRP1 BFI indication counter by 1 (from 1) (e.g., TRP1 BFI Cntr=2). In the example of FIG. 6, an RRC configured maximum count (Max Cnt) for the TRP1 BFI indication counter was previously set to equal 2 (previous RRC configuration step not shown). Therefore, the maximum count of the TRP1 BFI indication counter is reached (TRP1 BFI Cntr=2≥Max Cntr). Accordingly, at block 618, the MAC layer may start a beam failure recovery process. Accordingly, the MAC layer may start the TRP-specific BFR timer (e.g., the TRP1 BFR timer 621). The start of the TRP1 BFR timer 621 is graphically represented by the second vertical dashed line 641 of FIG. 6. The TRP1 BFR timer duration 622 of the TRP1 BFR timer 621 may have been previously configured by RRC signaling (not shown) using the parameter beamFailureRecoveryTimer_TRP-Specific, for example. At block 649, at least because the L1 layer did not receive an OOS indication associated with TRP2 at the fifth instance 502$t_5$, there is no need to reset and restart a TRP2 BFD timer, a TRP2 BFR timer, or increment a TRP2 BFI indication counter.

At a subsequent instance 603$t_n$, a new set of candidate beams, identified as the set q1, may be obtained by the scheduled entity. The set q1 may include the beams of the set q0 and may also include additional beams not currently used by the scheduled entity (e.g., the additional beams may be known by the scheduled entity but not used by the scheduled entity). Although depicted as being obtained after the fifth instance 602$t_5$, the scheduled entity may obtain the set q1 at any time. The additional beams of the set q1 may be used as backup or substitute beams if a beam failure recovery is needed. As illustrated, the set q1 includes one beam from TRP1, TRP2, TRP3, and TRP4. For ease of explanation, TRP1 is associated with the first TRP-specific BFD-RS 604, TRP2 is associated with the second TRP-specific BFD-RS 606, TRP3 is associated with the third TRP-specific BFD-RS 624, and TRP4 is associated with the fourth TRP-specific BFD-RS 626. At the subsequent instance 603$6$ the first beam associated with the first TRP-specific BFD-RS 604 of TRP1 remains in a beam failure state (e.g., RSRP<QoutLR).

At blocks 656, 657, 658, and 659, at the subsequent instance 603$t_n$, the MAC layer may send a plurality of requests (or one request) to the PHY layer to measure the RSRP of each of the respective candidate beams in the set q1. At block 666, L1 measurement of the first TRP-specific BFD-RS 604 indicates that the RSRP of the first TRP-specific BFD-RS (e.g., TRP1 BFD-RS) is less than QoutLR (e.g., TRP1 beam fail). At block 667, L1 measurement of the second TRP-specific BFD-RS 606 indicates that the RSRP of the second TRP-specific BFD-RS (e.g., TRP2 BFD-RS) is greater than or equal to Qin (e.g., TRP2 beam pass/nominal). At block 668, L1 measurement of the third TRP-specific BFD-RS 624 indicates that the RSRP of the third TRP-specific BFD-RS (e.g., TRP3 BFD-RS) is greater than or equal to Qin (e.g., TRP3 beam pass/nominal). At block 669, L1 measurement of the fourth TRP-specific BFD-RS 626 indicates that the RSRP of the fourth TRP-specific BFD-RS (e.g., TRP4 BFD-RS) is greater than or equal to Qin (e.g., TRP4 beam pass/nominal). The results may be reported to the MAC layer.

At block 630, the MAC layer evaluates the reported results and may identify candidate beams in the set q1 that have TRP-specific BFD-RS RSRP measurements greater than or equal to the second predetermined value, Qin. For example, the MAC layer may determine that the RSRPs corresponding to the third TRP-specific BFD-RS 624 and the fourth TRP-specific BFD-RS 626 are greater than the second predetermined value, Qin. In this example, the beams associated with the third TRP-specific BFD-RS 624 of TRP3 and the fourth TRP-specific BFD-RS 626 of TRP4 may be suitable replacements for the beam radiating the first TRP-specific BFD-RS 604 of TRP1.

Unlike the example of FIG. 5, the scheduled entity may engage in a random access procedure with one, not both, of TRP3 and TRP4. Identifying the suitable replacements may trigger the TRP-specific BFR processes. Accordingly, at block 630, as a part of the TRP-specific BFR processes, the MAC layer may trigger (e.g., by signaling the PHY layer) random access procedures with TRP3 or TRP4. The triggered random access procedure at block 630 may be a contention free random access (CFRA) procedure and/or a contention based random access (CBRA) procedure. In accordance with the type of procedure started at block 630, the MAC layer may start a CFRA timer and/or a CBRA timer.

The random access procedures associated with blocks 632, 636, 638, 639, 640, 643, 644, 646, and 649 are the same or substantially similar to the random access procedures associated with blocks 532, 536, 538, 539, 540, 543, 544, 546, and 549 of FIG. 5 and will not be repeated for the sake of brevity.

Figure 7:
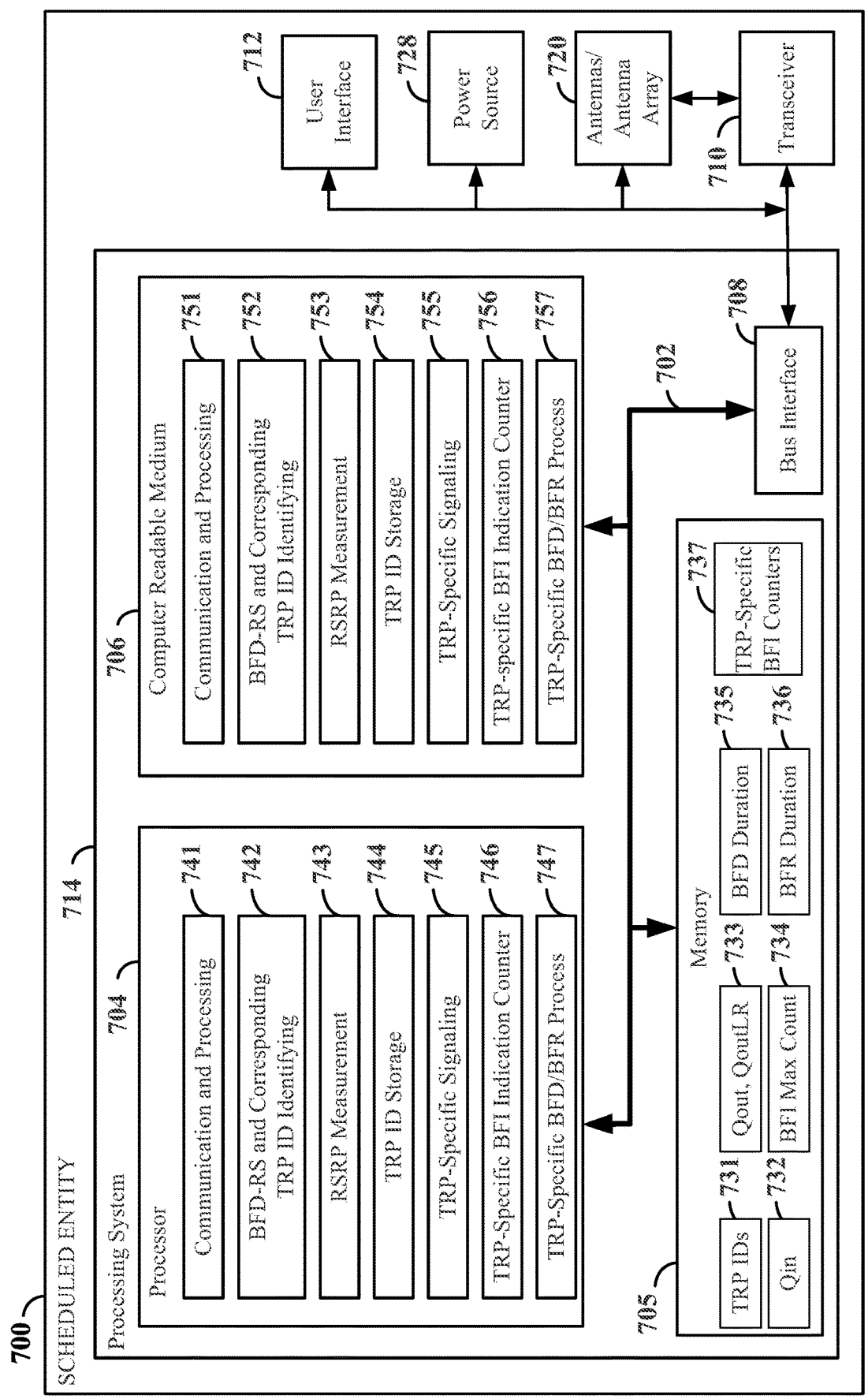
FIG. 7 is a block diagram illustrating an example of a hardware implementation of a scheduled entity employing a processing system according to some aspects of the disclosure.

FIG. 7 is a block diagram illustrating an example of a hardware implementation of scheduled entity 700 employing a processing system 714 according to some aspects of the disclosure. The scheduled entity 700 may be, for example, a UE or any scheduled entity or wireless communication device as illustrated in any one or more of FIGS. 1, 2, and/or 4.

In accordance with various aspects of the disclosure, an element, or any portion of an element, or any combination of elements may be implemented with a processing system 714 that includes one or more processors, such as processor 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 700 may be configured to perform any one or more of the functions described herein. That is, the processor 704, as utilized in a scheduled entity 700, may be used to implement any one or more of the methods or processes described and illustrated, for example, in FIGS. 8 and/or 9.

The processor 704 may in some instances be implemented via a baseband or modem chip and in other implementations, the processor 704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further.

A bus interface 708 provides an interface between the bus 702 and a transceiver 710. The transceiver 710 may be, for example, a wireless transceiver. The transceiver 710 provides a means for communicating with various other apparatus over a transmission medium (e.g., air interface). The transceiver 710 may further be coupled to one or more antennas/antenna array 720. The bus interface 708 further provides an interface between the bus 702 and a user interface 712 (e.g., keypad, display, touch screen, speaker, microphone, control features, etc.). Of course, such a user interface 712 is optional, and may be omitted in some examples. In addition, the bus interface 708 further provides an interface between the bus 702 and a power source 728, and between the bus 702 and the antennas/antenna array 720 (e.g., for switching and/or self-test, for example).

One or more processors, such as processor 704, may be responsible for managing the bus 702 and general processing, including the execution of software stored on the computer-readable medium 706. Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise. The software may reside on the computer-readable medium 706. The software, when executed by the processor 704, causes the processing system 714 to perform the various processes and functions described herein for any particular apparatus.

The computer-readable medium 706 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product or article of manufacture. By way of example, a computer program product or article of manufacture may include a computer-readable medium in packaging materials. In some examples, the computer-readable medium 706 may be part of the memory 705. Those skilled in the art will recognize how best to implement the described functionality presented throughout this disclosure depending on the particular application and the overall design constraints imposed on the overall system. The computer-readable medium 706 and/or the memory 705 may also be used for storing data that is manipulated by the processor 704 when executing software.

In some aspects of the disclosure, the processor 704 may include communication and processing circuitry 741 configured for various functions, including for example, communicating with a network core (e.g., a 5G core network), one or more scheduling entities, other scheduled entities, one or more TRPs, and/or any other entity, such as, for example, local infrastructure or an entity communicating with the scheduled entity 700 via the Internet, such as a network provider. According to some aspects, the various functions of the communication and processing circuitry 741 may be utilized to implement TRP-specific BFD processes, TRP-specific BFR processes, and/or TRP-specific MAC parameters (e.g., via MAC CEs) for use in the TRP-specific BFD process and/or the TRP-specific BFR process.

As used herein, the term "TRP-specific" may be understood as a reference to one type of beam group based beam failure recovery. For example, the TRP-specific BFD/BFR process circuitry 747, as well as any of the various circuits (741-747) implementing any of the features and processes described herein may be applied to other beam groups that are identified with at least one identifier (similar to, for example, the TRP ID exemplified herein). Examples of these types of beam groups may include, but are not limited to, groups where all beams are associated with the same scheduled entity panel and are identified by the panel identifier, groups of beams where a group includes all received beams that a scheduled entity receiver filter can simultaneously receive, and a group of beams that include any subset of beams from one or more scheduling entities (e.g., TRP, gNB, network access node, base station) where the configuration of the group of beams is indicated to a scheduled entity by the network and where the configuration indicates which beams belong to the group. The preceding list is exemplary and non-limiting.

In some examples, the communication and processing circuitry 741 may include one or more hardware components that provide the physical structure that performs processes related to wireless communication (e.g., signal reception and/or signal transmission) and signal processing (e.g., processing a received signal and/or processing a signal for transmission), as well as performs TRP-specific BFD processes and/or TRP-specific BFR processes. In addition, the communication and processing circuitry may be configured to, for example, verify that TRP-specific BFR is enabled, receive a beam failure instance (BFI) maximum count value, receive a plurality of TRP-specific BFIs that are respectively associated with respective TRP identifiers (TRP IDs), establish one TRP-specific BFI indication counter for each respective TRP ID, and increment a respective one of the TRP-specific BFI indication counters for each received respective TRP-specific BFI associated with a corresponding TRP ID. For each TRP ID, the communication and processing circuitry 741 may be configured to perform processes related to comparing a value of the respective TRP-specific BFI indication counter to the BFI maximum count value and trigger a TRP-specific BFR process associated with a respective TRP ID when a value of the respective TRP-specific BFI indication counter is equal to or greater than the BFI maximum count value. In addition, the communication and processing circuitry 741 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 741 may further be configured to execute communication and processing software 751 stored on the computer-readable medium 706 to implement one or more functions described herein.

In some aspects of the disclosure, the processor 704 may include TRP-specific beam failure detection—reference signal (BFD-RS) and corresponding respective transmission reception point identifier (TRP ID) identifying circuitry 742 configured for various functions, including, for example, identifying a respective TRP-specific BFD-RS and its corresponding respective TRP ID associated with each of a plurality of active beams received by a scheduled entity. In some examples, the TRP-specific BFD-RS and corresponding respective TRP ID identifying circuitry 742 may include one or more hardware components that provide the physical structure that performs processes related to performing the identifying the respective beam failure detection reference signal (TRP-specific BFD-RS) and its corresponding respective transmission reception point identifier (TRP ID) associated with each of the plurality of active beams received by the scheduled entity. The TRP-specific BFD-RS and corresponding respective TRP ID identifying circuitry 742 may further be configured to execute TRP-specific BFD-RS and corresponding respective TRP ID identifying software 752 stored on the computer-readable medium 706 to implement one or more functions described herein.

In some aspects of the disclosure, the processor 704 may include reference signal received power (RSRP) measurement circuitry 743 configured for various functions, including, for example, measuring a respective reference signal received power (RSRP) of the TRP-specific BFD-RS of each of the plurality of active beams. In some examples, the RSRP measurement circuitry 743 may include one or more hardware components that provide the physical structure that performs processes related to performing the measuring of the RSRP of the TRP-specific BFD-RS of each of the plurality of active beams. The RSRP measurement circuitry 743 may further be configured to execute RSRP measurement software 753 stored on the computer-readable medium 706 to implement one or more functions described herein.

In some aspects of the disclosure, the processor 704 may include TRP ID storage circuitry 744 configured for various functions, including, for example, storing the TRP ID associated with each TRP-specific BFD-RS of each of the plurality of active beams having a measured RSRP that is less than a predetermined value. The TRP ID(s) may be stored, for example, in a TRP ID storage location 731 in the memory 705 of the scheduled entity 700. The predetermined value may be, for example, QoutLR described herein. According to some aspects, the value of QoutLR may be stored in a QoutLR storage location 733 in the memory 705 of the scheduled entity 700. In some examples, the TRP ID storage circuitry 744 may include one or more hardware components that provide the physical structure that performs processes related to performing the storing of the TRP ID associated with each TRP-specific BFD-RS of each of the plurality of active beams having the measured RSRP that is less than the predetermined value. The TRP ID storage circuitry 744 may further be configured to execute TRP ID storage software 754 stored on the computer-readable medium 706 to implement one or more functions described herein.

In some aspects of the disclosure, the processor 704 may include TRP-specific signaling circuitry 745 configured for various functions, including, for example, transmitting TRP-specific signaling to a higher layer when a measured RSRP of a respective TRP-specific BFD-RS is less than a predetermined value. The higher layer may be, for example, a MAC layer. The predetermined value may be, for example, the value of the parameter QoutLR. The value of the parameter QoutLR may be stored, for example, in a QoutLR storage location 733 in the memory 705 of the scheduled entity 700. The related signaling may be, for example, an out-of-service (OOS) indication that may be indicated when an RSRP of a TRP-specific BFD-RS of a TRP having an associated TRP ID is less than the predetermined value (e.g., RSRP of TRP-specific BFD-RS<QoutLR). In some examples, the TRP-specific signaling circuitry 745 may also be configured to identify an acceptable candidate beam by comparing an RSRP of a TRP-specific BFD-RS of a candidate beam to a predetermined value, such as Qin (as described above). An RSRP of a TRP-specific BFD-RS of a candidate beam that was greater than or equal to Qin may be identified as an acceptable candidate beam for a BFR process. The value of the parameter Qin may be stored, for example, in a Qin storage location 732 in the memory 705 of the scheduled entity. In some examples, the TRP-specific signaling circuitry 745 may include one or more hardware components that provide the physical structure that performs processes related to transmitting TRP-specific signaling to a higher layer when a measured RSRP of a respective TRP-specific BFD-RS is less than a predetermined value. The TRP-specific signaling circuitry 745 may further be configured to execute TRP-specific signaling transmission software 755 stored on the computer-readable medium 706 to implement one or more functions described herein.

In some aspects of the disclosure, the processor 704 may include TRP-specific BFI indication counter circuitry 746 configured for various functions, including, for example, incrementing a respective one of a TRP-specific BFI indication counters corresponding to a given TRP ID for each received respective TRP-specific BFI indication associated with the given TRP ID. In some examples, the TRP-specific BFI indication counter circuitry 746 may include one or more hardware components that provide the physical structure that performs processes related to performing the incrementing of the respective one of a TRP-specific BFI indication counter corresponding to the given TRP ID for each received respective TRP-specific BFI indication associated with the given TRP ID. The TRP-specific BFI indication counter circuitry 746 may further be configured to execute TRP-specific BFI indication counter per TRP ID software 756 stored on the computer-readable medium 706 to implement one or more functions described herein.

In some aspects of the disclosure, the processor 704 may include TRP-specific BFD/BFR process circuitry 747 configured for various functions, including, for example, performing TRP-specific BFD process(es) and triggering a TRP-specific BFR process for each respective TRP ID when a value of the respective TRP-specific BFI indication counter is equal to or greater than a BFI maximum count parameter value. In some examples, the BFI maximum count parameter value may be stored, for example, in a BFI maximum count value storage location 734 in the memory 705 of the scheduled entity 700. In some examples, the TRP-specific BFD/BFR process circuitry 747 may include one or more hardware components that provide the physical structure that performs processes related to the performing of TRP-specific BFD process(es) and TRP-specific BFR process for each respective TRP ID when the value of the respective TRP-specific BFI indication counter is equal to or greater than a BFI maximum count parameter value. The BFI maximum count parameter value may be stored, for example, in a BFI maximum count parameter storage location in the memory 705 of the scheduled entity 700. The value of the number of BFI indications associated with each TRP ID may be incrementally accumulated and stored in, for example, in respective TRP-specific BFI counter value storage locations 737 in the memory 705 of the scheduled entity 700. Some processes related to performing TRP-specific BFD process(es) and TRP-specific BFR process(es) for each respective TRP ID may include, for example, resetting, stopping, starting, and running TRP-specific BFD counter(s) for a predetermined TRP-specific BFD timer duration, resetting, stopping, starting, and running TRP-specific BFR counter(s) for a predetermined BFR timer duration, requesting measurement reports detailing respective RSRPs of TRP-specific BFD-RSs of various active beams and/or candidate beams received by the scheduled entity 700 (as a function of TRP ID associated with each beam), receiving and evaluating the requested measurement reports to identify one or more acceptable candidate beams (e.g., candidate beams having RSRP of TRP-specific BFD-RS≥Qin), triggering a random access procedure (e.g., at a MAC layer), performing a random access procedure (e.g., at an L1 layer) such as a CFRA procedure and/or a CBRA procedure, and/or declaring a CFRA success, a CBRA success, or a radio link failure according to some aspects of the disclosure. The TRP-specific BFD timer duration parameter value may be stored, for example, in a TRP-specific BFD timer duration storage location 735 in the memory 705 of the scheduled entity 700. The TRP-specific BFR timer duration parameter value may be stored, for example, in a TRP-specific BFR timer duration storage location 736 in the memory 705 of the scheduled entity 700. The TRP-specific BFD/BFR process circuitry 747 may further be configured to execute TRP-specific BFD/BFR process software 757 stored on the computer-readable medium 706 to implement one or more functions described herein.

Two options for a TRP-specific BFD indicator (sometimes referred to as a TRP-specific BFD PHY indicator) for TRP-specific BFD/BFR processes are described. According to the first option, a single indicator may be used without regard to whether a TRP-specific beam failure detection is associated with a specific TRP ID or not associated with any specific TRP ID. This option may appear to be an option that might be utilized in connection with an all-cell BFD/BFR process; however, it may be distinguished from the all-cell BFD/BFR process because the scheduled entity PHY layer may be caused to identify and store one or more TRP IDs associated with a corresponding one or more failed TRPs.

According to one aspect, the PHY layer may be caused to transmit the one or more stored TRP IDs to a scheduling entity (e.g., a gNB, a base station) in a BFR request (BFRQ) on an uplink resource of a working TRP. For example, if there were two active TRPs (TRP1 and TRP2) and TRP1 had a beam failure, the PHY layer may be caused to store the TRP ID of TRP1 for subsequent transmission in a BFRQ on the uplink resources of TRP2. In this way, the failed TRP1 could be identified to the scheduling entity.

According to another aspect, the PHY layer may be caused to store the TRP ID of TRP1 (as a failed TRP) and caused to transmit a BFRQ on the uplink resources of TRP1 (the failed TRP) to the scheduling entity. In this way, based on a format or indicator conveyed in association with or in the BFRQ, the scheduling entity may be alerted to the beam failure of TRP1. According to both aspects, the BFRQ may be a random access channel (RACH) request, for example.

According to the just-described aspects, for example, the PHY layer may be caused to identify and store the one or more TRP IDs of failed TRPs. The PHY layer may thus have the identity of the failed TRPs stored in a memory (e.g., in a TRP ID storage location 731 in the memory 705 of the scheduled entity 700); however, the PHY layer may not include the one or more TRP IDs in any signaling sent to a higher layer (e.g., the MAC layer). Such signaling may include a BFD indicator, such as an OOS indication that the PHY layer may use to indicate a beam failure detection to the higher layer. The BFD indicator may be TRP-specific or TRP agnostic. According to this aspect, the higher layer may continue assuming that a beam failure event may be attributable to a single TRP or multiple TRPs. That is, the higher layer would continue to be unable to associate any beam failure event with a specific TRP ID (e.g., the beam failure event would continue to be understood by the higher layer as being an all-cell failure, not a TRP-specific failure). According to this aspect, the higher layer may be considered a TRP ID agnostic layer. However, as described above, the higher layer may become aware of a TRP ID if a beam failure recovery was triggered for a specific TRP identified by a TRP ID.

In all cases, the TRP-specific BFD indicator may be generated by a beam failure event detected via a measurement of an RSRP of a TRP-specific BFD-RS of a specific TRP (e.g., identified by a specific TRP ID). For example, the RSRP measurement circuitry 743, working alone or in combination with one or both of the communication and processing circuitry 741 and/or the TRP-specific BFD-RS and corresponding TRP ID identifying circuitry 742, may measure an RSRP of a TRP-specific BFD-RS of the specific TRP and determine that the measured RSRP is less than a predetermined value. According to some aspects, the predetermined value may be Qout or QoutLR; both are described above. The TRP-specific BFD indicator may then be generated (or otherwise obtained) and included in PHY signaling to a higher layer (e.g., the MAC layer). An example of a TRP-specific BFD indicator in such PHY signaling may be the OOS indication signaling illustrated and described in connection with FIG. 6.

An explicit flag may enable the inclusion of the TRP-specific BFD indicator (e.g., in PHY signaling or signaling from the PHY to a higher layer, such as the MAC layer). For example, according to the first example, the TRP-specific BFD indicator may be realized in a new TRP-specific BFR enablement flag that may be implemented in new or existing signaling. The new or existing signaling may be included in a communication standard.

According to a second example, an implicit aspect may enable the inclusion of the TRP-specific BFD indicator (e.g., in PHY signaling or signaling from the PHY to a higher layer, such as the MAC layer). For example, the TRP-specific BFD indicator may be implicitly recognized if TRP-specific MAC parameters are configured.

The TRP-specific BFD indicator may be time-limited. For example, the TRP-specific BFD indicator may have a TRP-specific BFD indicator period that may be determined based on one or both of: a TRP-specific cycle, or a discontinuous reception (DRX) cycle of the scheduled entity. According to some aspects, the TRP-specific BFD indicator period may be a value of a TRP-specific BFD timer set by the higher layer (e.g., the MAC layer) when the higher layer, for example, receives an OOS indication from the PHY layer.

In the examples provided herein, a reference to a "higher layer" may be a reference to a medium access control (MAC) layer. In some examples, a scheduled entity may configure the MAC layer with a TRP-specific MAC parameter indicating that the TRP-specific signaling is related to an all-cell BFD/BFR process or a TRP-specific BFD/BFR process. In some examples, the TRP-specific signaling may include the TRP-specific BFD indicator, which may include, or may by itself indicate, a period of a TRP-specific beam failure detection (BFD) timer configured by the higher layer. The duration of the TRP-specific BFD timer (e.g., as given by the parameter "TRP-specific BFD timer duration") may be dependent on whether the scheduled entity is in a non-discontinuous reception (non-DRX) mode or a DRX mode.

By way of a first non-limiting example, the TRP-specific BFD timer duration (sometimes referred to as a TRP-specific BFD indicator duration) for a non-DRX mode implementation may be a maximum of either: a minimum TRP-specific BFD-RS period for a single TRP or a first predetermined duration. In other words, for the non-DRX mode, the TRP-specific BFD indicator duration may be given by the following equation:

TRP-specific BFD timer duration=max(min TRP-specific BFD-RS period for single TRP,a first predetermined duration) (1)

By way of a second non-limiting example, the TRP-specific BFD timer duration may be a function of or dependent upon a DRX cycle length. In one example, the TRP-specific BFD timer duration may change based on comparing the DRX cycle length to a second predetermined duration. For example, for a DRX cycle length less than or equal to the second predetermined duration, the TRP-specific BFD timer duration may be a maximum of either: a minimum TRP-specific BFD-RS period for a single TRP×1.5, or a DRX cycle length×1.5. In other words, for a DRX cycle length less than or equal to the second predetermined duration, the TRP-specific BFD timer duration may be given by the following equation:

TRP-specific BFD timer duration=max(min TRP-specific BFD-RS period for single TRP×$M$, DRX cycle length×$N$), (2)

where M and N are scaling factors.

The value of 1.5 corresponding to the M and N scaling factors, as used above, is provided for exemplary and non-limiting purposes. For example, M and N can be any value; and M and N can be different values. Generally, M may be greater than N, equal to N, or less than N. The scaling factors M and N may scale the TRP-specific BFD-RS period and the DRX cycle length, respectively. For example, a scaling factor set greater than 1 may increase the parameter it is scaling; a scaling factor set less than 1 may decrease the parameter it is scaling; a scaling factor set equal to 1 neither increases nor decreases the parameter it is scaling.

According to some aspects, for a DRX cycle length greater than the second predetermined duration, the TRP-specific BFD timer duration may be equal to the DRX cycle length. In other words, for a DRX cycle length greater than the second predetermined duration, the TRP-specific BFD timer duration may be given by the following equation:

TRP-specific BFD timer duration=DRX cycle length (3)

The first predetermined duration and the second predetermined duration may be preconfigured to the scheduled entity and stored in a memory of the scheduled entity, for example, in the memory 705 of the scheduled entity 700. The preceding examples and equations are provided for illustrative and non-limiting purposes.

Exemplary and non-limiting options for implementation of one or more TRP-specific MAC parameters for TRP-specific BFD/BFR processes may be described in connection with the two following options. According to a first option, a single set of TRP-specific MAC parameters may be established. This first option for implementing TRP-specific MAC parameters for TRP-specific BFD/BFR processes may pair with the above-described first option for implementing the TRP-specific BFD indicator for TRP-specific BFD/BFR processes, according to some aspects of the disclosure.

According to this first option, the MAC layer may not have information regarding an origin of a TRP beam failure. In other words, the TRP ID of the failed TRP beam may not be passed to the MAC layer from the PHY layer. Accordingly, the MAC layer may issue a BFRQ without knowing (e.g., having stored in a memory) the TRP ID of the failed TRP beam; however, as previously described, the TRP ID of the failed TRP beam may be known by the PHY layer. According to this first option, the scheduled entity may reuse the signaling format of an existing TRP-specific BFD indicator (e.g., reuse a signaling format of the OOS indication, previously described in connection with FIG. 5). The signaling format of the TRP-specific BFD indicator (e.g., the OOS indication) may be obtained, for example, from a standards specification. Furthermore, the scheduled entity may reuse any existing TRP-specific MAC parameters. The scheduling entity may configure the existing TRP-specific MAC parameters (e.g., TRP, gNB, base station) to the scheduled entity over RRC signaling.

Still, further, the scheduled entity may reuse any exiting MAC BFR triggering logic (which, for example, may be implemented in the TRP-specific BFD/BFR process circuitry 747 of the processor 704 of the scheduled entity 700). The MAC BFR triggering logic may be defined by rules established and maintained by certain standard-setting organizations. Therefore, for this first option, MAC layer operation may be unchanged (e.g., implementing a TRP-specific BFR process). This option may rely on the PHY layer to identify, store, and transmit the TRP ID associated with each active beam received by the scheduled entity when a measured reference signal received power (RSRP) of the TRP-specific BFD-RS of each active beam is less than a predetermined value. The predetermined value may be the threshold level parameter referred to and described herein as Qout or QoutLR. According to this option, the PHY layer may conduct a TRP-specific BFR process by transmitting the BFRQ on an UL resource (indicating TRP ID). As previously described in connection with the PHY layer, the PHY layer may transmit the BFRQ on an UL resource associated with a working TRP (e.g., a non-failed TRP). In this aspect, the BFRQ may include the TRP ID of the failed TRP. The transmission of the BFRQ may be accomplished utilizing, for example, the TRP-specific signaling circuitry 745 of the processor 704 in connection with the transceiver 710 and antennas/antenna array 720 of the scheduled entity 700.

According to another aspect, and as previously described, the PHY layer may send the BFRQ using a RACH resource or beam associated with the failed TRP. When a RACH is sent to a scheduling entity on a TRP beam of a failed TRP, the scheduling entity may recover the failed beam. Again, the transmission of the BFRQ may be accomplished utilizing, for example, the TRP-specific signaling circuitry 745 of the processor 704 in connection with the transceiver 710 and antennas/antenna array 720 of the scheduled entity 700.

According to a second option, a TRP-specific MAC parameter may be paired with and used together with the second option (described above) to implement a TRP-specific BFD indicator for TRP-specific BFD/BFR process triggering. According to this second option, the MAC layer may know (e.g., have stored in a memory) the one or more TRP IDs of the failed one or more TRPs. Accordingly, the MAC layer may directly issue a BFRQ, based for example, on a BFR process, to an UL resource of a working TRP. According to this aspect, a TRP-specific BFD indicator plus TRP-specific MAC parameter may be used as inputs to TRP-specific BFR process circuitry of the scheduled entity (e.g., such as TRP-specific BFD/BFR process circuitry 747 of the scheduled entity 700). The TRP-specific BFR process circuitry may trigger a TRP-specific BFR process.

The TRP-specific MAC parameters may include, for example, a beam failure instance indication counter value, a beam failure detection timer duration value, a beam failure instance maximum count value, a Qout parameter, and/or a QoutLR parameter, and/or a Qin parameter value.

The TRP-specific BFR process circuitry (e.g., TRP-specific BFD/BFR process circuitry 747 of scheduled entity 700) may be used if a TRP-specific BFR process is enabled. Otherwise, existing BFR process triggering logic may be used. The TRP-specific BFR process may be enabled by, for example, an explicit flag that may be set in a beam failure detection indicator received from the PHY layer. The flag may be referred to as a TRP-specific BFR enablement flag. The TRP-specific BFR process may be enabled by, for example, an implicit indication in TRP-specific MAC parameter(s) if those MAC parameters are configured to the scheduled entity.

As described above, the TRP-specific BFD/BFR process circuitry 747 may have inputs of at least the TRP-specific BFD indicator and the TRP-specific MAC parameter(s). Existing BFR process triggering circuitry (not shown) may have similar inputs, namely an existing TRP-specific BFD indicator and existing TRP-specific MAC parameter(s).

A TRP-specific beam failure may be announced, for example, if a predetermined number, X, of TRP-specific BFI indications are continuously received within a predetermined time interval (e.g., a predetermined duration, a predetermined TRP-specific BFD timer duration). The predetermined time interval may be, in one example, a configured duration. The predetermined number, X, may correspond to the TRP-specific MAC parameter referred to as the beamFailureInstanceMaxCount value. The TRP-specific BFI indications that may be continuously received may be counted on respective TRP-specific beam failure instance indication counters (TRP-specific BFI indication counters). The value of the TRP-specific BFI indication counters may be stored, for example, in TRP-specific BFI counter value storage locations 737 in the memory 705 of the scheduled entity 700. Upon reaching or exceeding a predetermined TRP-specific BFI indication count value (e.g., a predetermined maximum TRP-specific BFI indication count value stored, for example, in the BFI maximum count value storage location 734 of the memory 705 of the scheduled entity 700), the scheduled entity may trigger a TRP-specific BFR process. The value of the predetermined maximum TRP-specific BFI indication count value may be changed dynamically. The TRP-specific BFI indication counter value may be compared to the BFI maximum count value. If the former exceeds the latter within the beam failure detection timer duration, a TRP-specific beam failure detection may be announced.

The following is a non-limiting example of pseudo-code that may be employed at a scheduled entity to determine whether to trigger a TRP-specific BFR process or a cell-level BFR process.

If a beam failure is announced for a TRP (having a given TRP ID):
  if at least one TRP is working (e.g., at least one TRP that is in a nominal (not failed) state or the at least one TRP has announced but has recovered from the beam failure (e.g., a TRP-specific BFR response has been received)):
    trigger a TRP-specific BFR process (for the given TRP ID),
  otherwise (e.g., all TRPs have failed):
    trigger a cell-level BFR process (e.g., an SpCell or an SCell BFR process),
End.

Another non-limiting pseudo-code example may be employed at a scheduled entity to determine whether to trigger a TRP-specific BFR process or a cell-level BFR process.

If a TRP-specific BFR process is enabled:
  if a TRP-specific BFI indication associated with a given TRP ID in a given cell is received from a lower layer:
    start or restart a TRP-specific BFD timer (for the given TRP ID), increment a TRP-specific BFI indication counter by 1 (for the given TRP ID),
  if a value of a respective TRP-specific BFI indication counter value (of each TRP ID)≥the BFI maximum count value for all respective TRP IDs in the given cell,
  and if a respective BFR response(s) is not received for all respective TRP IDs in the given cell (e.g., all TRP(s) are in a failed state without being recovered):
    trigger a cell-level BFR process (e.g., a PCell, SpCell, or SCell BFR process) for the given cell,
  otherwise (e.g., there is at least one working TRP (i.e., a TRP in a nominal (not failed) state)):
    trigger a TRP-specific BFR process for the given TRP ID,
if the TRP-specific BFD timer (for the given TRP ID) expires,
or if the TRP-specific BFD timer, TRP-specific BFI indication maximum count value, or any of the reference signals used for beam failure detection for the given TRP ID is reconfigured by upper layers associated with the given cell:
  set the BFI indicator counter (for the given TRP ID) to 0,
if TRP-specific BFR response is received (for the given TRP ID),
or if the given TRP ID or a given serving cell that includes the given TRP ID is deactivated,
  set the TRP-specific BFI indication counter value (for the given TRP ID) to 0,
  consider the TRP-specific BFR process completed, and
  cancel all triggered TRP-specific BFR processes for the
    given TRP ID,
Otherwise:
if a TRP-specific BFI indication is received (for the given TRP ID):
  trigger an all-cell BFR process (e.g., an SpCell or an SCell BFR process),
End.

The TRP-specific BFD timer may be identified, for example, as a beamFailureDetectionTimer_TRP-Specific in various standards. The TRP-specific BFI indication counter may be identified, for example, as a BFI_COUNTER_TRP-Specific in various standards.

Figure 8:
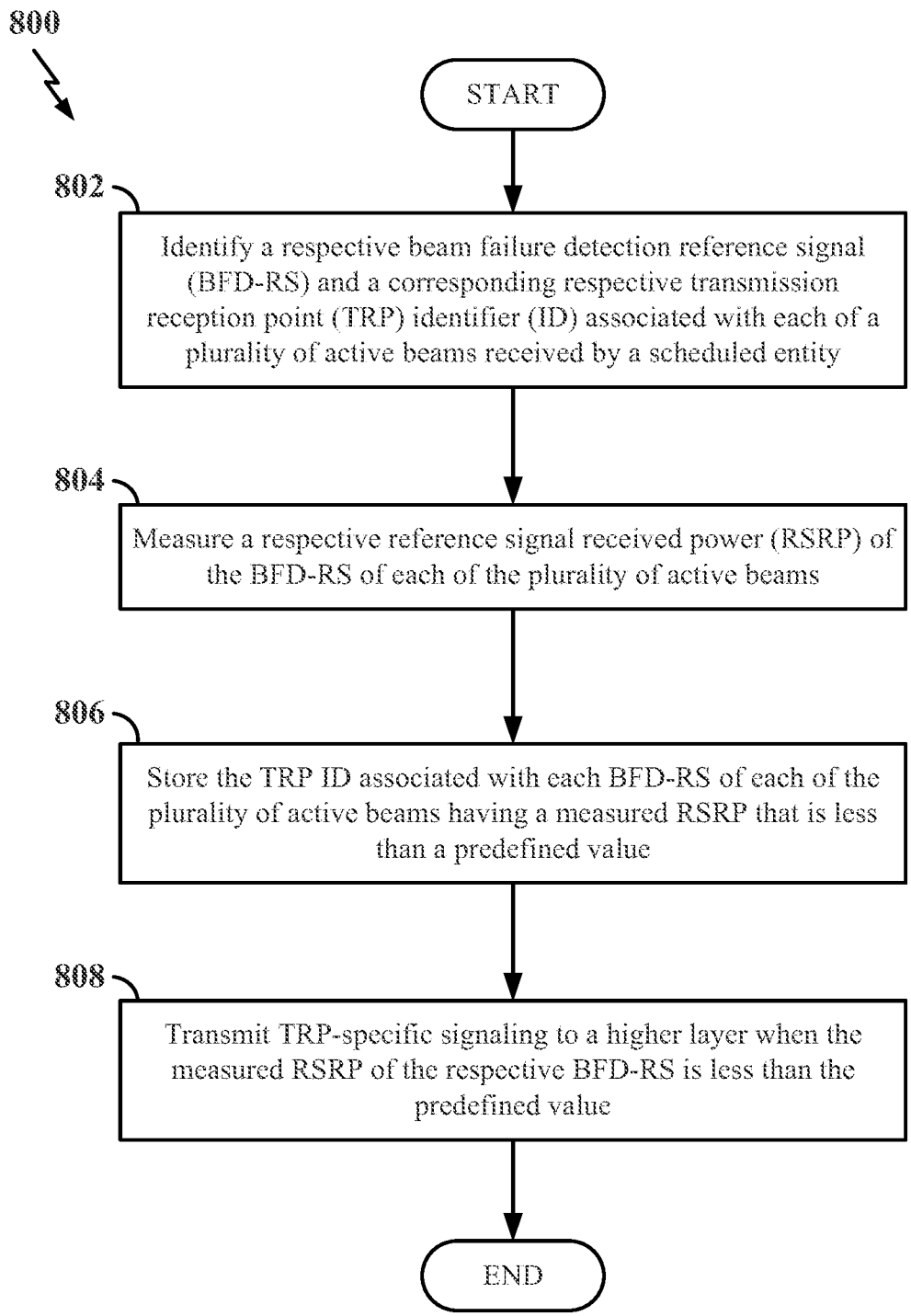
FIG. 8 is a flow chart illustrating an exemplary process for beam failure recovery at a scheduled entity in a wireless communication network in accordance with some aspects of the disclosure.

FIG. 8 is a flow chart illustrating an exemplary process 800 (e.g., a method) of beam failure recovery at a scheduled entity (e.g., a UE) in a wireless communication network in accordance with some aspects of the disclosure. As described below, some or all illustrated features may be omitted in a particular implementation within the scope of the present disclosure, and some illustrated features may not be required for the implementation of all examples. In some examples, the process 800 may be carried out by the scheduled entity 700 illustrated in FIG. 7. In some examples, the process 800 may be carried out by any suitable apparatus or means for carrying out the functions or algorithms described herein.

At block 802, the scheduled entity may identify a respective TRP-specific beam failure detection reference signal (BFD-RS) and a corresponding respective transmission reception point (TRP) identifier (ID) associated with each of a plurality of active beams received by the scheduled entity. For example, the TRP-specific BFD-RS and corresponding TRP ID identifying circuitry 742, alone or in combination with the communication and processing circuitry 741 and/or the TRP-specific BFD/BFR process circuitry 747, shown and described in connection with FIG. 7, may provide a means for identifying of a respective TRP-specific beam failure detection reference signal (BFD-RS) and a corresponding respective transmission reception point (TRP) identifier (ID) associated with each of a plurality of active beams received by the scheduled entity.

At block 804, the scheduled entity may measure a respective reference signal received power (RSRP) of the TRP-specific BFD-RS of each of the plurality of active beams. For example, the RSRP measurement circuitry 743, alone or in combination with the communication and processing circuitry 741 and/or the TRP-specific BFD/BFR process circuitry 747, shown and described in connection with FIG. 7, may provide a means for measuring a respective reference signal received power (RSRP) of the TRP-specific BFD-RS of each of the plurality of active beams.

At block 806, the scheduled entity may store the TRP ID associated with each TRP-specific BFD-RS of each of the plurality of active beams having a measured RSRP that is less than a predetermined value. For example, the TRP ID storage circuitry 744, alone or in combination with the communication and processing circuitry 741 and/or the TRP-specific BFD/BFR process circuitry 747, shown and described in connection with FIG. 7, may provide a means for storing the TRP ID associated with each TRP-specific BFD-RS of each of the plurality of active beams having a measured RSRP that is less than a predetermined value.

At block 808, the scheduled entity may transmit TRP-specific signaling to a higher layer when the measured RSRP of the respective TRP-specific BFD-RS is less than the predetermined value. In some aspects, transmitting TRP-specific signaling may involve transmitting the TRP-specific signaling to the higher layer in an absence of an indication of an associated TRP ID. According to such aspects, the higher layer may be TRP ID agnostic. The higher layer may be a medium access control (MAC) layer. In some examples, the scheduled entity may additionally trigger a transmission of a beam failure recovery request (BFRQ) based on signaling received from the higher layer in response to transmitting the TRP-specific signaling to the higher layer. The scheduled entity may further include the stored TRP ID associated with each TRP-specific BFD-RS of each of the plurality of active beams having the measured RSRP that is less than the predetermined value with the transmission of the BFRQ. The BFRQ may be a random access channel (RACH) request, for example According to some examples, the TRP-specific signaling may be an OOS indication. In some examples, the TRP-specific signaling may include a flag indicating that the TRP-specific signaling is related to either an all-cell beam failure recovery (BFR) process or a TRP-specific BFR process. According to some examples, the higher layer may be a medium access control (MAC) layer, and the MAC layer may be configured with a TRP-specific MAC parameter indicating that the TRP-specific signaling is related to either an all-cell BFR process or a TRP-specific BFR process. In one example, the TRP-specific signaling may include a TRP-specific BFD indication that indicates a TRP-specific BFD timer duration configured by the higher layer. The TRP-specific BFD timer duration may be dependent on whether the scheduled entity is in a non-discontinuous reception (non-DRX) mode or a DRX mode. According to some examples, the TRP-specific BFD timer duration may be given by the following equations: first, for non-DRX mode, the TRP-specific BFD timer duration=max (min TRP-specific BFD-RS period for a single TRP, a first predetermined duration), second, for a DRX cycle length≤a second predetermined duration: the TRP-specific BFD timer duration=max (min TRP-specific BFD-RS period for the single TRP×M, DRX cycle length× N), where M and N are scaling factors, and third for the DRX cycle length>the second predetermined duration: the TRP-specific BFD timer duration=the DRX cycle length. For example, the TRP-specific signaling circuitry 745, alone or in combination with the communication and processing circuitry 741 and/or the TRP-specific BFD/BFR process circuitry 747, shown and described in connection with FIG. 7, may provide a means for transmitting TRP-specific signaling to a higher layer when a measured RSRP of a respective TRP-specific BFD-RS is less than a predetermined value.

Figure 9:
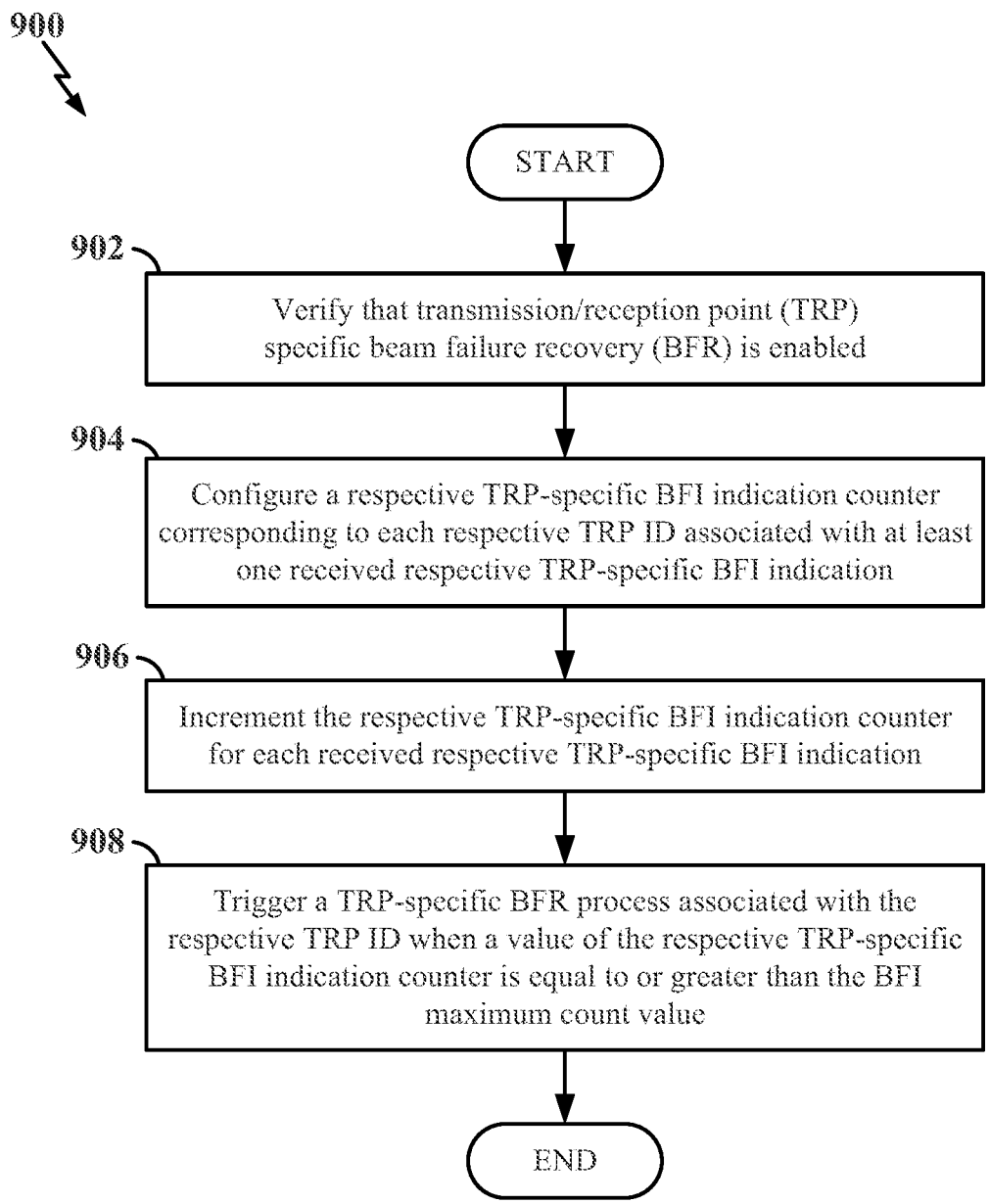
FIG. 9 is a flow chart illustrating an exemplary process for beam failure recovery at a medium access control (MAC) layer of a user equipment (UE) in a wireless communication network in accordance with some aspects of the disclosure.

FIG. 9 is a flow chart illustrating an exemplary process 900 (e.g., a method) of beam failure recovery at a medium access control (MAC) layer of a scheduled entity (e.g., a UE) in a wireless communication network in accordance with some aspects of the disclosure. As described below, some or all illustrated features may be omitted in a particular implementation within the scope of the present disclosure, and some illustrated features may not be required for the implementation of all examples. In some examples, the process 900 may be carried out by the scheduled entity 700 illustrated in FIG. 7. In some examples, the process 900 may be carried out by any suitable apparatus or means for carrying out the functions or algorithms described herein.

At block 902, the MAC layer of the scheduled entity may verify that transmission reception point (TRP)-specific beam failure recovery (BFR) is enabled. According to some aspects, verifying that TRP-specific beam BFR is enabled may further include at least one of: receiving signaling from a scheduling entity indicating that TRP-specific BFR is enabled, or obtaining an indication, from a TRP-specific medium access control (MAC) parameter, that TRP-specific BFR is enabled. For example, the communication and processing circuitry 741, shown and described in connection with FIG. 7, may provide a means for verifying that TRP-specific beam failure recovery (BFR) is enabled.

At block 904, the MAC layer of the scheduled entity may configure a respective TRP-specific beam failure instance (BFI) indication counter corresponding to each respective TRP ID associated with at least one received respective TRP-specific BFI indication. For example, the TRP-specific BFI indication counter circuitry 746 and TRP-specific BFI counter value storage locations 737 in the memory 705, shown and described in connection with FIG. 7, may provide a means for configuring a respective TRP-specific beam failure instance (BFI) indication counter corresponding to each respective TRP ID associated with at least one received respective TRP-specific BFI indication.

At block 906, the MAC layer of the scheduled entity may increment the respective TRP-specific BFI indication counter for each received respective TRP-specific BFI indication. For example, the communication and processing circuitry 741 in connection with the TRP-specific BFI indication counter circuitry 746, shown and described in connection with FIG. 7, may provide a means for incrementing the respective TRP-specific BFI indication counter for each received respective TRP-specific BFI indication.

At block 908, the MAC layer of the scheduled entity may trigger a TRP-specific BFR process associated with the respective TRP ID when a value of the respective TRP-specific BFI indication counter is equal to or greater than the BFI maximum count value. The TRP-specific BFR process may include sending, at the MAC layer of the scheduled entity, signaling to a lower layer of the scheduled entity to cause the lower layer to trigger a beam failure recovery request (BFRQ) identifying a candidate beam to replace a failed beam associated with the respective TRP ID. According to some aspects, the lower layer may be a PHY layer and the BFRQ may be a random access channel (RACH) request. For example, the communication and processing circuitry 741 in connection with the TRP-specific BFI indication counter circuitry 746, shown and described in connection with FIG. 7, may provide a means for triggering a TRP-specific BFR process associated with the respective TRP ID when a value of the respective TRP-specific BFI indication counter is equal to or greater than the BFI maximum count value.

According to some aspects, the MAC layer of the scheduling entity may also configure a respective TRP-specific BFD timer corresponding to the respective TRP ID associated with the at least one received respective TRP-specific BFI indication, start the respective TRP-specific BFD timer upon receiving the at least one received respective TRP-specific BFI indication, and trigger the TRP-specific BFR process associated with the respective TRP ID associated with the at least one received respective TRP-specific BFI indication in response to the respective BFI indication counter being equal to or greater than a predetermined BFI maximum count value and the respective TRP-specific BFD timer being less than a predetermined TRP-specific BFD timer duration.

Figure 10:
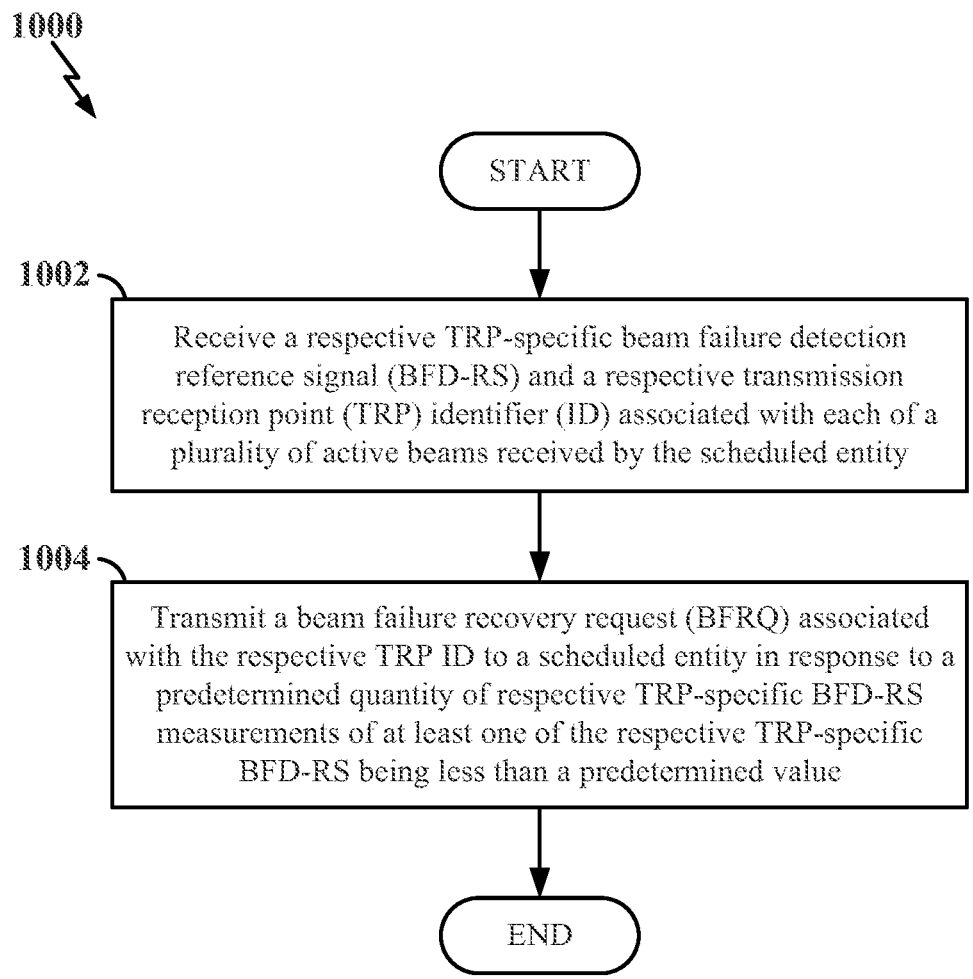
FIG. 10 is a flow chart illustrating an exemplary process for beam failure recovery at a scheduled entity in a wireless communication network in accordance with some aspects of the disclosure.

FIG. 10 is a flow chart illustrating an exemplary process for beam failure recovery at a scheduled entity in a wireless communication network in accordance with some aspects of the disclosure. As described below, some or all illustrated features may be omitted in a particular implementation within the scope of the present disclosure, and some illustrated features may not be required for the implementation of all examples. In some examples, the process 1000 may be carried out by the scheduled entity 700 illustrated in FIG. 7. In some examples, the process 1000 may be carried out by any suitable apparatus or means for carrying out the functions or algorithms described herein.

At block 1002, the scheduled entity may receive a respective TRP-specific beam failure detection reference signal (BFD-RS) and a respective transmission reception point (TRP) identifier (ID) associated with each of a plurality of active beams received by the scheduled entity. For example, the BFD-RS and corresponding TRP ID identifying circuitry 742, shown and described in connection with FIG. 7, may provide a means for receiving a respective TRP-specific BFD-RS and a respective TRP ID associated with each of a plurality of active beams received by the scheduled entity.

According to some aspects, the scheduled entity may store, at a first layer of the scheduled entity, the respective TRP ID associated with each respective TRP-specific BFD-RS measurement that is less than the predetermined value, and send respective TRP-specific signaling, including the respective TRP ID associated with each respective TRP-specific BFD-RS measurement that is less than the predetermined value from the first layer of the scheduled entity to a second layer of the scheduled entity, where the second layer is higher than the first layer. In some examples, the respective TRP-specific signaling may include an OOS indication. In some examples, the respective TRP-specific signaling may include a flag indicating that the respective TRP-specific signaling is related to a TRP-specific BFR process. In some examples, the second layer may be a medium access control (MAC) layer, and the scheduled entity may configure the MAC layer with a TRP-specific MAC parameter indicating that the respective TRP-specific signaling may be related to a TRP-specific BFR process.

According to some aspects of the disclosure, the scheduled entity may also configure a respective TRP-specific BFD timer corresponding to each TRP ID associated with each respective TRP-specific BFD-RS measurement that is less than the predetermined value, and the respective TRP-specific signaling may include a respective TRP-specific BFD timer duration associated with the respective TRP-specific BFD timer.

In some examples, the respective TRP-specific BFD timer duration may be dependent on whether the scheduled entity is in a non-discontinuous reception (non-DRX) mode or a DRX mode. For example, when the scheduled entity is in a non-DRX mode, the TRP-specific BFD timer duration may equal max (min TRP-specific BFD-RS period for a single TRP, a first predetermined duration). According to another example, when the scheduled entity is in a DRX mode and has a first DRX cycle length that is less than or equal to a second predetermined duration, the TRP-specific BFD timer duration may equal max (min TRP-specific BFD-RS period for the single TRP×M, first DRX cycle length×N), where M and N are scaling factors. When the DRX mode has a second DRX cycle length that is greater than the second predetermined duration, the TRP-specific BFD timer duration may equal the second DRX cycle length. The preceding aspects are exemplary and non-limiting.

At block 1004, the scheduled entity may transmit a beam failure recovery request (BFRQ) associated with the respective TRP ID to a scheduling entity in response to a predetermined quantity of respective TRP-specific BFD-RS measurements of at least one of the respective TRP-specific BFD-RS being less than a predetermined value. For example, the communication and processing circuitry 741 in connection with the TRP-specific signaling circuitry 745, the transceiver 710, and/or antennas/antenna array 720, shown and described in connection with FIG. 7, may provide a means for transmitting a BFRQ associated with the respective TRP ID to a scheduling entity in response to a predetermined quantity of respective TRP-specific BFD-RS measurements of at least one of the respective TRP-specific BFD-RS being less than a predetermined value.

According to some aspects, the scheduled entity may trigger the transmitting of the BFRQ based on an evaluation of a plurality of respective TRP-specific counters, where each respective TRP-specific counter may be associated with a corresponding respective TRP ID. In some examples, the BFRQ may be a random access channel (RACH) request. According to some aspects, the scheduled entity may also transmit the BFRQ on a beam corresponding to at least one of the respective TRP-specific BFD-RS having a TRP-specific BFD-RS measurement that is greater than the predetermined value.

Figure 11:
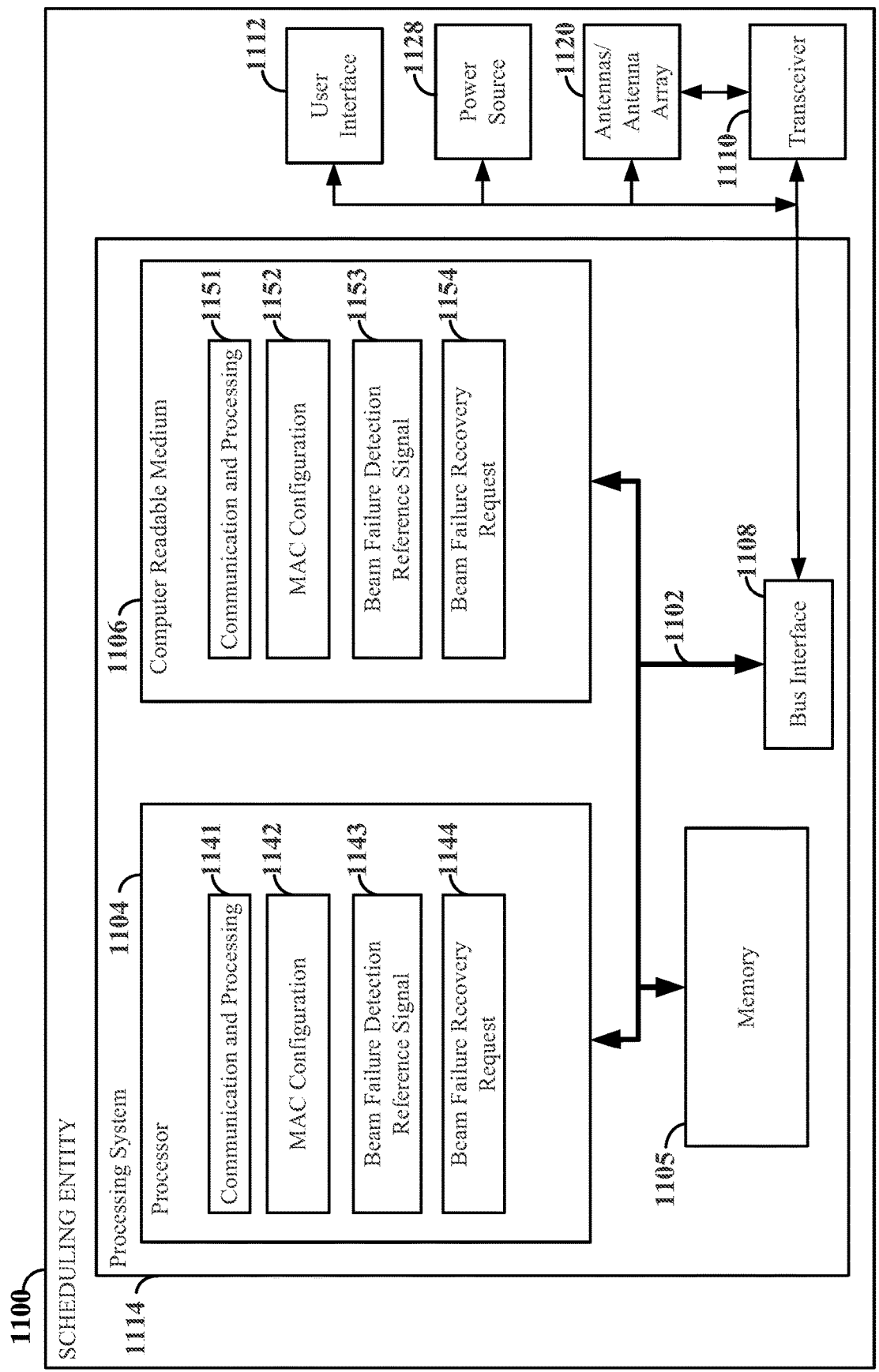
FIG. 11 is a block diagram illustrating an example of a hardware implementation of a scheduling entity employing a processing system according to some aspects of the disclosure.

FIG. 11 is a block diagram illustrating an example of a hardware implementation of a scheduling entity 1100 (e.g., a TRP, a gNB, a base station) employing a processing system 1114 according to some aspects of the disclosure. The scheduling entity 1100 may be, for example, any scheduling entity or wireless communication device as illustrated in any one or more of FIGS. 1, 2, and/or 4. In accordance with various aspects of the disclosure, an element, or any portion of an element, or any combination of elements may be implemented with a processing system 1114 that includes one or more processors, such as processor 1104. The processing system 1114 may be substantially the same as the processing system 714 illustrated and described in connection with FIG. 7, including a bus interface 1108, a bus 1102, a memory 1105, a processor 1104, and a computer-readable medium 1106. Furthermore, the scheduling entity 1100 may include a user interface 1112, a transceiver 1110, antennas/antenna array 1120, and power source 1128, substantially similar to those described above in FIG. 7. Accordingly, their descriptions will not be repeated for the sake of brevity.

In some aspects of the disclosure, the processor 1104 may include communication and processing circuitry 1141 configured for various functions, including, for example, communicating with a network core (e.g., a 5G core network), TRPs, scheduled entities, user equipment, other scheduling entities, or any other entity, such as, for example, local infrastructure or an entity communicating with the scheduling entity 1100 via the Internet, such as a network provider. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1141 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 1141 may further be configured to execute communication and processing software 1151 stored on the computer-readable medium 1106 to implement one or more functions described herein.

In some aspects of the disclosure, the processor 1104 may include medium access control (MAC) configuration circuitry 1142 configured for various functions, including, for example, configuring at least one TRP-specific MAC parameter to a scheduled entity over radio resource control (RRC) signaling. The plurality of TRP-specific MAC parameters may include, for example, at least one of: a TRP-specific beam failure detection (BFD) timer duration corresponding to a TRP-specific BFD timer, a TRP-specific beam failure recovery (BFR) timer duration corresponding to a TRP-specific BFR timer, or a TRP-specific beam failure instance (BFI) maximum value corresponding to a TRP-specific BFI indication counter. In some examples, the TRP-specific MAC parameters may include a value of Qout, QoutLR, and/or a value of Qin. In some examples, the MAC configuration circuitry 1142 may include one or more hardware components that provide the physical structure that performs processes related to performing the configuring of at least one TRP-specific MAC parameter to a scheduled entity over radio resource control (RRC) signaling. The MAC configuration circuitry 1142 may further be configured to execute MAC configuration software 1152 stored on the computer-readable medium 1106 to implement one or more functions described herein.

In some aspects of the disclosure, the processor 1104 may include beam failure detection reference signal (BFD-RS) circuitry 1143 (e.g., TRP-specific BFD-RS circuitry) configured for various functions, including, for example, transmitting at least one beam failure detection reference signal (e.g., a BFD-RS, a TRP-specific BFD-RS) having a corresponding transmission reception point (TRP) identifier (ID) to a scheduled entity. In some examples, the BFD-RS circuitry 1143 may include one or more hardware components that provide the physical structure that performs processes related to transmitting at least one beam failure detection reference signal having a corresponding transmission reception point (TRP) identifier (ID) to a scheduled entity. The BFD-RS circuitry 1143 may further be configured to execute beam failure detection reference signal software 1153 stored on the computer-readable medium 1106 to implement one or more functions described herein.

In some aspects of the disclosure, the processor 1104 may include beam failure recovery request circuitry 1144 (e.g., TRP-specific beam failure recovery request circuitry) configured for various functions, including, for example, receiving, from a scheduled entity, a beam failure recovery request (e.g., a TRP-specific beam failure recovery request), where at least one TRP-specific medium access control (MAC) parameter was used to trigger the beam failure recovery request. The beam failure recovery request circuitry 1144 may further be configured for other various functions, including, for example, engaging in a random access procedure with, for example, the scheduled entity sending the beam failure recovery request. In some examples, the beam failure recovery request circuitry 1144 may include one or more hardware components that provide the physical structure that performs processes related to performing the receiving, from the scheduling entity, a beam failure recovery request based on a TRP-specific beam failure recovery process and engaging in the random access procedure with, for example, the scheduled entity sending the beam failure recovery request, where at least one TRP-specific medium access control (MAC) parameter was used to trigger the beam failure recovery request. The beam failure recovery request circuitry 1144 may further be configured to execute beam failure recovery request software 1154 (e.g., TRP-specific beam failure recovery request software) stored on the computer-readable medium 1106 to implement one or more functions described herein.

Figure 12:
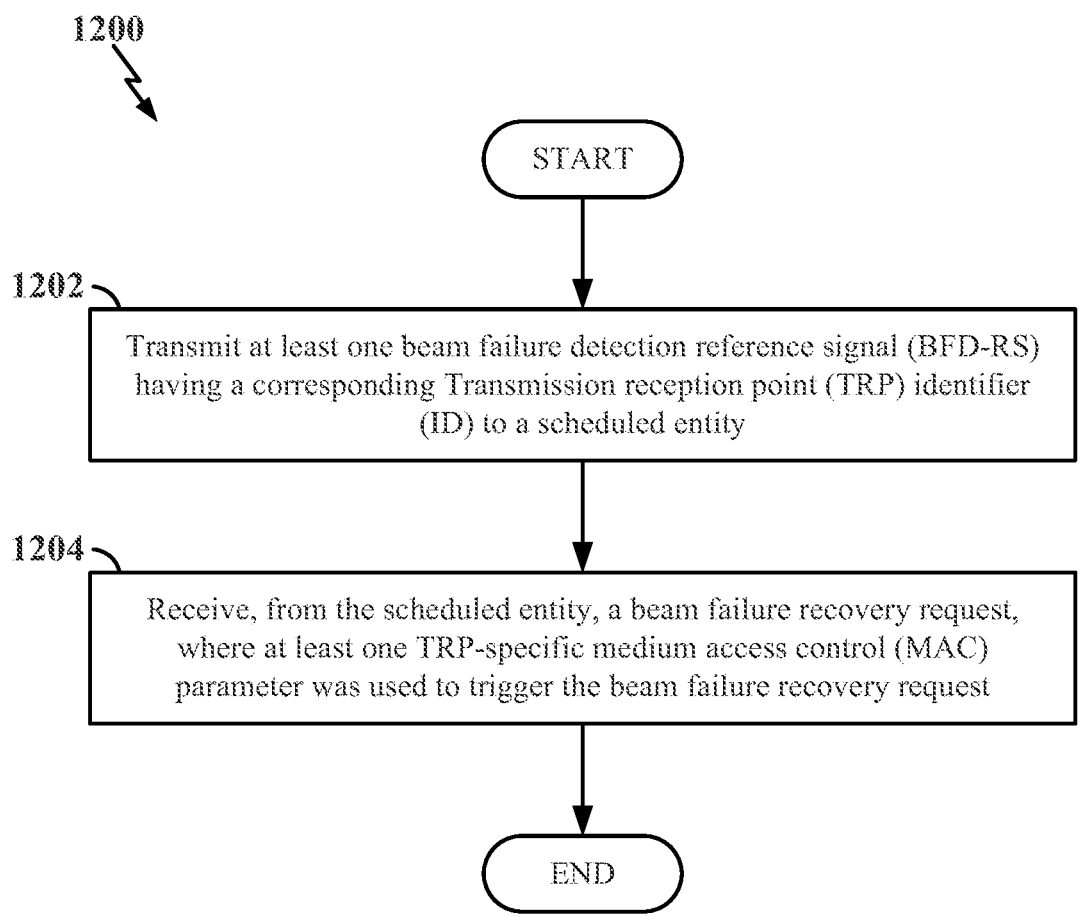
FIG. 12 is a flow chart illustrating an exemplary process of using TRP-specific parameters at a scheduling entity in a wireless communication network in accordance with some aspects of the disclosure.

FIG. 12 is a flow chart illustrating an exemplary process 1200 (e.g., a method) at a scheduling entity (e.g., a TRP, a gNB, a network access node, a base station) of using TRP-specific parameters in a wireless communication network in accordance with some aspects of the disclosure. Some or all illustrated features may be omitted in a particular implementation within the scope of the present disclosure, and some illustrated features may not be required for the implementation of all examples. In some examples, the process 1200 may be carried out by the scheduling entity 1100 illustrated in FIG. 11. In some examples, the process 1200 may be carried out by any suitable apparatus or means for carrying out the functions or algorithms described herein.

At block 1202, the scheduling entity may transmit at least one beam failure detection reference signal (BFR-RS) having a corresponding transmission reception point (TRP) identifier (ID) to a scheduled entity. For example, the BFD-RS circuitry 1143, alone or in combination with the one or more of the communication and processing circuitry 1141, the transceiver 1110 and the antennas/antenna array 1120, shown and described in connection with FIG. 11, may provide a means for performing the transmitting of at least one beam failure detection reference signal (BFR-RS) having a corresponding transmission reception point (TRP) identifier (ID) to a scheduled entity.

At block 1204, the scheduling entity may receive, from the scheduled entity, a beam failure recovery request, where at least one TRP-specific medium access control (MAC) parameter was used to trigger the beam failure recovery request. For example, the beam failure recovery request circuitry 1144, alone or in combination with the one or more of the communication and processing circuitry 1141, the transceiver 1110 and the antennas/antenna array 1120, shown and described in connection with FIG. 11, may provide a means for performing the receiving, from the scheduled entity, of a beam failure recovery request, where at least one TRP-specific medium access control (MAC) parameter was used to trigger the beam failure recovery request. According to some aspects, the at least one TRP-specific MAC parameter may include at least one of: a TRP-specific beam failure detection (BFD) timer duration corresponding to a TRP-specific BFD timer, a TRP-specific beam failure recovery (BFR) timer duration corresponding to a TRP-specific BFR timer, or a TRP-specific beam failure instance (BFI) maximum value corresponding to a TRP-specific BFI indication counter.

According to some aspects, the scheduling entity may also configure the at least one TRP-specific MAC parameter to the scheduled entity over radio resource control (RRC) signaling.

According to some examples, the scheduling entity may also set a TRP-specific beam failure enablement flag in RRC signaling. The TRP-specific beam failure enablement flag may be configured to indicate an enablement, or lack thereof, of TRP-specific beam failure detection and/or TRP-specific beam failure recovery at the scheduled entity.

Of course, in the above examples, the circuitry included in the processor 704 and/or the processor 1104 is merely provided as an example, and other means for carrying out the described functions may be included within various aspects of the present disclosure, including but not limited to the instructions stored in the computer-readable medium 706, 1106 or any other suitable apparatus or means described in any one of the FIGS. 1-4, 7, and/or 11, and utilizing, for example, the processes and/or algorithms described herein in relation to FIGS. 5, 6, 8, 9, 10, and/or 12.

The following provides an overview of aspects of the present disclosure:

Aspect 1: A scheduled entity in a wireless communication network, comprising: a wireless transceiver, a memory, and a processor communicatively coupled to the wireless transceiver and the memory, wherein the processor and the memory are configured to: receive a respective transmission reception point (TRP)-specific beam failure detection reference signal (BFD-RS) and a respective TRP identifier (ID) associated with each of a plurality of active beams received by the scheduled entity; and transmit a beam failure recovery request (BFRQ) associated with the respective TRP ID to a scheduling entity in response to a predetermined quantity of respective TRP-specific BFD-RS measurements of at least one of the respective TRP-specific BFD-RS being less than a predetermined value.

Aspect 2: The scheduled entity of aspect 1, wherein the processor and the memory are further configured to: trigger the transmitting of the BFRQ based on an evaluation of a plurality of respective TRP-specific counters, wherein each respective TRP-specific counter is associated with a corresponding respective TRP ID.

Aspect 3: The scheduled entity of aspect 2, wherein the BFRQ is a random access channel (RACH) request.

Aspect 4: The scheduled entity of any of aspects 1 through 3, wherein the processor and the memory are further configured to: transmit the BFRQ on a beam corresponding to at least one of the respective TRP-specific BFD-RS having a TRP-specific BFD-RS measurement that is greater than the predetermined value.

Aspect 5: The scheduled entity of any of aspects 1 through 4, wherein the processor and the memory are further configured to: store, at a first layer of the scheduled entity, the respective TRP ID associated with each respective TRP-specific BFD-RS measurement that is less than the predetermined value; and send respective TRP-specific signaling including the respective TRP ID associated with each respective TRP-specific BFD-RS measurement that is less than the predetermined value from the first layer of the scheduled entity to a second layer of the scheduled entity, wherein the second layer is higher than the first layer.

Aspect 6: The scheduled entity of any of aspects 1 through 5, wherein the respective TRP-specific signaling further includes an out-of-service (OOS) indication.

Aspect 7: The scheduled entity of any of aspects 1 through 6, wherein the respective TRP-specific signaling further includes a flag indicating that the respective TRP-specific signaling is related to a TRP-specific BFR process.

Aspect 8: The scheduled entity of any of aspects 1 through 7, wherein the second layer is a medium access control (MAC) layer and the processor and the memory are further configured to: configure the MAC layer with a TRP-specific MAC parameter indicating that the respective TRP-specific signaling is related to a TRP-specific BFR process.

Aspect 9: The scheduled entity of any of aspects 1 through 8, wherein the processor and the memory are further configured to: configure a respective TRP-specific BFD timer corresponding to each TRP ID associated with each respective TRP-specific BFD-RS measurement that is less than the predetermined value, wherein the respective TRP-specific signaling includes a respective TRP-specific BFD timer duration associated with the respective TRP-specific BFD timer.

Aspect 10: The scheduled entity of any of aspects 1 through 9, wherein the respective TRP-specific BFD timer duration is dependent on whether the scheduled entity is in a non-discontinuous reception (non-DRX) mode or a DRX mode.

Aspect 11: A method of beam failure recovery at a scheduled entity in a wireless communication network, comprising: receiving a respective transmission reception point (TRP)-specific beam failure detection reference signal (BFD-RS) and a respective TRP identifier (ID) associated with each of a plurality of active beams received by the scheduled entity; and transmitting a beam failure recovery request (BFRQ) associated with the respective TRP ID to a scheduled entity in response to a predetermined quantity of respective TRP-specific BFD-RS measurements of at least one of the respective TRP-specific BFD-RS being less than a predetermined value.

Aspect 12: The method of aspect 11, further comprising: triggering the transmitting of the BFRQ based on an evaluation of a plurality of respective TRP-specific counters, each of the plurality of respective TRP-specific counters being associated with a corresponding respective TRP ID.

Aspect 13: The method of aspect 11 or 12, further comprising: transmitting the BFRQ on a beam corresponding to at least one of the respective TRP-specific BFD-RS having a TRP-specific BFD-RS measurement that is greater than the predetermined value.

Aspect 14: The method of any of aspects 11 through 13, further comprising: storing, at a first layer of the scheduled entity, the respective TRP ID associated with each respective TRP-specific BFD-RS measurement that is less than the predetermined value; and sending respective TRP-specific signaling including the respective TRP ID associated with each respective TRP-specific BFD-RS measurement that is less than the predetermined value from the first layer of the scheduled entity to a second layer of the scheduled entity, wherein the second layer is higher than the first layer.

Aspect 15: The method of any of aspects 11 through 14, wherein the respective TRP-specific signaling further includes an out-of-service (OOS) indication.

Aspect 16: The method of any of aspects 11 through 15, wherein the respective TRP-specific signaling further includes a flag indicating that the respective TRP-specific signaling is related to a TRP-specific BFR process.

Aspect 17: The method of any of aspects 11 through 16, wherein the second layer is a medium access control (MAC) layer, the method further comprising: configuring the MAC layer with a TRP-specific MAC parameter indicating that the respective TRP-specific signaling is related to a TRP-specific BFR process.

Aspect 18: The method of any of aspects 11 through 17, further comprising: configuring a respective TRP-specific BFD timer corresponding to each TRP ID associated with each respective TRP-specific BFD-RS measurement that is less than the predetermined value, wherein the respective TRP-specific signaling includes a respective TRP-specific BFD timer duration associated with the respective TRP-specific BFD timer.

Aspect 19: The method of any of aspects 11 through 18, wherein the respective TRP-specific BFD timer duration is dependent on whether the scheduled entity is in a non-discontinuous reception (non-DRX) mode or a DRX mode.

Aspect 20: The method of any of aspects 11 through 19, further comprising: verifying, at a medium access control (MAC) layer of the scheduled entity, that transmission reception point (TRP)-specific beam failure recovery (BFR) is enabled, configuring, at the MAC layer, a respective TRP-specific beam failure instance (BFI) indication counter corresponding to each respective TRP ID associated with at least one received respective TRP-specific BFI indication, incrementing, at the MAC layer, the respective TRP-specific BFI indication counter for each received respective TRP-specific BFI indication, triggering, at the MAC layer, a TRP-specific BFR process associated with the respective TRP ID when a value of the respective TRP-specific BFI indication counter is equal to or greater than a predetermined BFI maximum count value.

Aspect 21: The method of any of aspects 11 through 20, wherein the verifying that the TRP-specific BFR is enabled further comprises at least one of: receiving signaling from a scheduling entity indicating that TRP-specific BFR is enabled; or obtaining an indication, from a TRP-specific medium access control (MAC) parameter, that TRP-specific BFR is enabled.

Aspect 22: The method of any of aspects 11 through 21, further comprising: configuring, at the MAC layer, a respective TRP-specific BFD timer corresponding to the respective TRP ID associated with the at least one received respective TRP-specific BFI indication, starting the respective TRP-specific BFD timer upon receiving the at least one received respective TRP-specific BFI indication; and triggering the TRP-specific BFR process associated with the respective TRP ID associated with the at least one received respective TRP-specific BFI indication in response to the respective BFI indication counter being equal to or greater than the predetermined BFI maximum count value and the respective TRP-specific BFD timer being less than a predetermined TRP-specific BFD timer duration.

Aspect 23: The method of any of aspects 11 through 22, wherein the TRP-specific BFR process comprises: sending, at the MAC layer of the scheduled entity, signaling to a lower layer of the scheduled entity to cause the lower layer to trigger a beam failure recovery request (BFRQ) identifying a candidate beam to replace a failed beam associated with the respective TRP ID.

Aspect 24: The method of any of aspects 11 through 23, wherein the lower layer is a PHY layer and the BFRQ is a random access channel (RACH) request.

Aspect 25: A scheduling entity in a wireless communication network, comprising: a wireless transceiver, a memory, and a processor communicatively coupled to the wireless transceiver and the memory, wherein the processor and the memory are configured to: transmit at least one beam failure detection reference signal having a corresponding transmission reception point (TRP) identifier (ID) to a scheduled entity, and receive, from the scheduled entity, a beam failure recovery request, wherein at least one TRP-specific medium access control (MAC) parameter was used to trigger the beam failure recovery request.

Aspect 26: The scheduling entity of aspect 25, wherein the at least one TRP-specific MAC parameter includes at least one of: a TRP-specific beam failure detection (BFD) timer duration corresponding to a TRP-specific BFD timer, a TRP-specific beam failure recovery (BFR) timer duration corresponding to a TRP-specific BFR timer, or a TRP-specific beam failure instance (BFI) maximum value corresponding to a TRP-specific BFI indication counter.

Aspect 27: The scheduling entity of aspect 25 or 26, wherein the processor and the memory are further configured to: configure the at least one TRP-specific MAC parameter to the scheduled entity over radio resource control (RRC) signaling.

Aspect 28: A method of beam failure recovery at a scheduling entity in a wireless communication network, comprising: transmitting at least one beam failure detection reference signal having a corresponding transmission reception point (TRP) identifier (ID) to a scheduled entity, and receiving, from the scheduled entity, a beam failure recovery request, wherein at least one TRP-specific medium access control (MAC) parameter was used to trigger the beam failure recovery request.

Aspect 29: The method of aspect 28, wherein the at least one TRP-specific MAC parameter includes at least one of: a TRP-specific beam failure detection (BFD) timer duration corresponding to a TRP-specific BFD timer, a TRP-specific beam failure recovery (BFR) timer duration corresponding to a TRP-specific BFR timer, or a TRP-specific beam failure instance (BFI) maximum value corresponding to a TRP-specific BFI indication counter.

Aspect 30: The method of aspect 28 or 29, further comprising: configuring the at least one TRP-specific MAC parameter to the scheduled entity over radio resource control (RRC) signaling.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Similarly, a phrase referring to "A and/or B" is intended to cover: A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A scheduled entity in a wireless communication network, comprising:
   a wireless transceiver;
   a memory; and
   a processor communicatively coupled to the wireless transceiver and the memory, wherein the processor and the memory are configured to:
   receive a respective transmission reception point (TRP)-specific beam failure detection reference signal (BFD-RS) and a respective TRP identifier (ID) associated with each of a plurality of active beams received by the scheduled entity;
   store, at a first layer of the scheduled entity, the respective TRP ID associated with each respective TRP-specific BFD-RS measurement that is less than a predetermined value; and
   send respective TRP-specific signaling including the respective TRP ID associated with each respective TRP-specific BFD-RS measurement that is less than the predetermined value from the first layer of the scheduled entity to a second layer of the scheduled entity, wherein the second layer is higher than the first layer; and
   transmit a beam failure recovery request (BFRQ) associated with the respective TRP ID to a scheduling entity in response to a predetermined quantity of respective TRP-specific BFD-RS measurements of at least one of the respective TRP-specific BFD-RS being less than the predetermined value.

2. The scheduled entity of claim 1, wherein the processor and the memory are further configured to:
   trigger the transmitting of the BFRQ based on an evaluation of a plurality of respective TRP-specific counters, wherein each respective TRP-specific counter is associated with a corresponding respective TRP ID.

3. The scheduled entity of claim 2, wherein the BFRQ is a random access channel (RACH) request.

4. The scheduled entity of claim 2, wherein the processor and the memory are further configured to:
   transmit the BFRQ on a beam corresponding to at least one of the respective TRP-specific BFD-RS having a TRP-specific BFD-RS measurement that is greater than the predetermined value.

5. The scheduled entity of claim 1, wherein the respective TRP-specific signaling further includes an out-of-service (OOS) indication.

6. The scheduled entity of claim 1, wherein the respective TRP-specific signaling further includes a flag indicating that the respective TRP-specific signaling is related to a TRP-specific BFR process.

7. The scheduled entity of claim 1, wherein the second layer is a medium access control (MAC) layer and the processor and the memory are further configured to:
   configure the MAC layer with a TRP-specific MAC parameter indicating that the respective TRP-specific signaling is related to a TRP-specific BFR process.

8. The scheduled entity of claim 1, wherein the processor and the memory are further configured to:
   configure a respective TRP-specific BFD timer corresponding to each TRP ID associated with each respective TRP-specific BFD-RS measurement that is less than the predetermined value,
   wherein the respective TRP-specific signaling includes a respective TRP-specific BFD timer duration associated with the respective TRP-specific BFD timer.

9. The scheduled entity of claim 8, wherein the respective TRP-specific BFD timer duration is dependent on whether the scheduled entity is in a non-discontinuous reception (non-DRX) mode or a DRX mode.

10. A method of beam failure recovery at a scheduled entity in a wireless communication network, comprising:
    receiving a respective transmission reception point (TRP)-specific beam failure detection reference signal (BFD-RS) and a respective TRP identifier (ID) associated with each of a plurality of active beams received by the scheduled entity;
    storing, at a first layer of the scheduled entity, the respective TRP ID associated with each respective TRP-specific BFD-RS measurement that is less than a predetermined value; and
    sending respective TRP-specific signaling including the respective TRP ID associated with each respective TRP-specific BFD-RS measurement that is less than the predetermined value from the first layer of the scheduled entity to a second layer of the scheduled entity, wherein the second layer is higher than the first layer; and
    transmitting a beam failure recovery request (BFRQ) associated with the respective TRP ID to a scheduled entity in response to a predetermined quantity of respective TRP-specific BFD-RS measurements of at least one of the respective TRP-specific BFD-RS being less than a predetermined value.

11. The method of claim 10, further comprising:
    triggering the transmitting of the BFRQ based on an evaluation of a plurality of respective TRP-specific counters, each of the plurality of respective TRP-specific counters being associated with a corresponding respective TRP ID.

12. The method of claim 11, further comprising:
    transmitting the BFRQ on a beam corresponding to at least one of the respective TRP-specific BFD-RS having a TRP-specific BFD-RS measurement that is greater than the predetermined value.

13. The method of claim 10, wherein the respective TRP-specific signaling further includes an out-of-service (OOS) indication.

14. The method of claim 10, wherein the respective TRP-specific signaling further includes a flag indicating that the respective TRP-specific signaling is related to a TRP-specific BFR process.

15. The method of claim 10, wherein the second layer is a medium access control (MAC) layer, the method further comprising:
configuring the MAC layer with a TRP-specific MAC parameter indicating that the respective TRP-specific signaling is related to a TRP-specific BFR process.

16. The method of claim 10, further comprising:
configuring a respective TRP-specific BFD timer corresponding to each TRP ID associated with each respective TRP-specific BFD-RS measurement that is less than the predetermined value,
wherein the respective TRP-specific signaling includes a respective TRP-specific BFD timer duration associated with the respective TRP-specific BFD timer.

17. The method of claim 16, wherein the respective TRP-specific BFD timer duration is dependent on whether the scheduled entity is in a non-discontinuous reception (non-DRX) mode or a DRX mode.

18. The method of claim 10, further comprising:
verifying, at a medium access control (MAC) layer of the scheduled entity, that transmission reception point (TRP)-specific beam failure recovery (BFR) is enabled;
configuring, at the MAC layer, a respective TRP-specific beam failure instance (BFI) indication counter corresponding to each respective TRP ID associated with at least one received respective TRP-specific BFI indication;
incrementing, at the MAC layer, the respective TRP-specific BFI indication counter for each received respective TRP-specific BFI indication;
triggering, at the MAC layer, a TRP-specific BFR process associated with the respective TRP ID when a value of the respective TRP-specific BFI indication counter is equal to or greater than a predetermined BFI maximum count value.

19. The method of claim 18, wherein the verifying that the TRP-specific BFR is enabled further comprises at least one of:
receiving signaling from a scheduling entity indicating that TRP-specific BFR is enabled; or
obtaining an indication, from a TRP-specific medium access control (MAC) parameter, that TRP-specific BFR is enabled.

20. The method of claim 18, further comprising:
configuring, at the MAC layer, a respective TRP-specific BFD timer corresponding to the respective TRP ID associated with the at least one received respective TRP-specific BFI indication;
starting the respective TRP-specific BFD timer upon receiving the at least one received respective TRP-specific BFI indication; and
triggering the TRP-specific BFR process associated with the respective TRP ID associated with the at least one received respective TRP-specific BFI indication in response to the respective BFI indication counter being equal to or greater than the predetermined BFI maximum count value and the respective TRP-specific BFD timer being less than a predetermined TRP-specific BFD timer duration.

21. The method of claim 18, wherein the TRP-specific BFR process comprises:
sending, at the MAC layer of the scheduled entity, signaling to the lower layer of the scheduled entity to cause the lower layer to trigger a beam failure recovery request (BFRQ) identifying a candidate beam to replace a failed beam associated with the respective TRP ID.

22. The method of claim 21, wherein the lower layer is a PHY layer and the BFRQ is a random access channel (RACH) request.

* * * * *